United States Patent
Sawai et al.

(10) Patent No.: US 7,529,638 B2
(45) Date of Patent: May 5, 2009

(54) METHOD OF CALCULATING TWIST ANGLE IN WIRE-LIKE STRUCTURE, APPARATUS FOR THE SAME, AND PROGRAM FOR THE SAME

(75) Inventors: Masayoshi Sawai, Kosai (JP); Akiko Nakano, Kosai (JP)

(73) Assignee: Yazaki Corporation, Tokyo (JP)

( * ) Notice: Subject to any disclaimer, the term of this patent is extended or adjusted under 35 U.S.C. 154(b) by 157 days.

(21) Appl. No.: 10/553,983

(22) PCT Filed: May 14, 2004

(86) PCT No.: PCT/JP2004/006892

§ 371 (c)(1),
(2), (4) Date: Oct. 20, 2005

(87) PCT Pub. No.: WO2004/102428

PCT Pub. Date: Nov. 25, 2004

(65) Prior Publication Data

US 2006/0235644 A1   Oct. 19, 2006

(30) Foreign Application Priority Data

May 15, 2003  (JP) .............. 2003-137294
Jan. 20, 2004  (JP) .............. 2004-011570

(51) Int. Cl.
G06F 19/00   (2006.01)
(52) U.S. Cl. .................... 702/150; 702/1; 702/127; 702/6

(58) Field of Classification Search .............. 702/155, 702/1, 127, 150, 151; 703/1, 2, 6, 12; 716/1, 716/4, 8, 10, 12, 14
See application file for complete search history.

(56) References Cited

U.S. PATENT DOCUMENTS

| | | | |
|---|---|---|---|
| 5,506,950 A * | 4/1996 | Hughes et al. | 345/420 |
| 6,842,173 B2 * | 1/2005 | Sakakura et al. | 345/419 |
| 2003/0020711 A1 | 1/2003 | Sakakura et al. | |
| 2003/0020715 A1 | 1/2003 | Sakakura et al. | |

(Continued)

FOREIGN PATENT DOCUMENTS

EP   1 267 284 A2 *  12/2002

(Continued)

OTHER PUBLICATIONS

B. Nath, "Matrix Finite Element Method", Aug. 10, 1978, pp. 7-15.

*Primary Examiner*—Edward R Cosimano
(74) *Attorney, Agent, or Firm*—Sughrue Mion, PLLC

(57) ABSTRACT

A method which can correctly calculate a twist angle in a wire harness, an apparatus for the method, and a program for the method are provided. In the invention, a shape obtained by deforming a reference shape model and superimposing the deformed reference shape model on a deformed shape model is calculated with using a finite element method, while referring physical properties of a wire-like structure. In accordance with the superimposition, also a reference axis of the reference shape model is rotated. An angle formed by the reference axis at the timing when the superimposition is ended, and a clamp axis of the deformed shape model and/or a virtual clamp axis is calculated as a twist angle.

26 Claims, 26 Drawing Sheets

U.S. PATENT DOCUMENTS

2003/0050723 A1 * 3/2003 Ozaki ......................... 700/97
2004/0176862 A1 * 9/2004 Tsuchiya et al. .............. 700/97

FOREIGN PATENT DOCUMENTS

| EP | 1 267 285 A2 | * | 12/2002 |
| EP | 1 267 286 A2 | * | 12/2002 |
| JP | 2002-373533 A | | 12/2002 |

* cited by examiner

FIG. 3

| RESTRAINED DEGREES OF FREEDOM / SUPPORT MEMBER | X-AXIS TRANSLATION | Y-AXIS TRANSLATION | Z-AXIS TRANSLATION | X-AXIS ROTATION | Y-AXIS ROTATION | Z-AXIS ROTATION |
|---|---|---|---|---|---|---|
| COMPLETE RESTRAINT / CONNECTOR | DISABLED | DISABLED | DISABLED | DISABLED | DISABLED | DISABLED |
| COMPLETE RESTRAINT / LONG-HOLE CLAMP | DISABLED | DISABLED | DISABLED | DISABLED | DISABLED | DISABLED |
| ROTATIONAL RESTRAINT / ROUND-HOLE CLAMP | DISABLED | DISABLED | DISABLED | ENABLED | DISABLED | ENABLED |
| ROTATIONAL RESTRAINT / CORRUGATED LONG-HOLE CLAMP | DISABLED | DISABLED | DISABLED | ENABLED | DISABLED | DISABLED |
| ROTATIONAL RESTRAINT / CORRUGATED ROUND-HOLE CLAMP | DISABLED | DISABLED | ENABLED | ENABLED | DISABLED | ENABLED |
| COMPLETE FREEDOM / BRANCH POINT | ENABLED | ENABLED | ENABLED | ENABLED | ENABLED | ENABLED |

C1-C7: BEAM ELEMENT
N0-N7: NODE

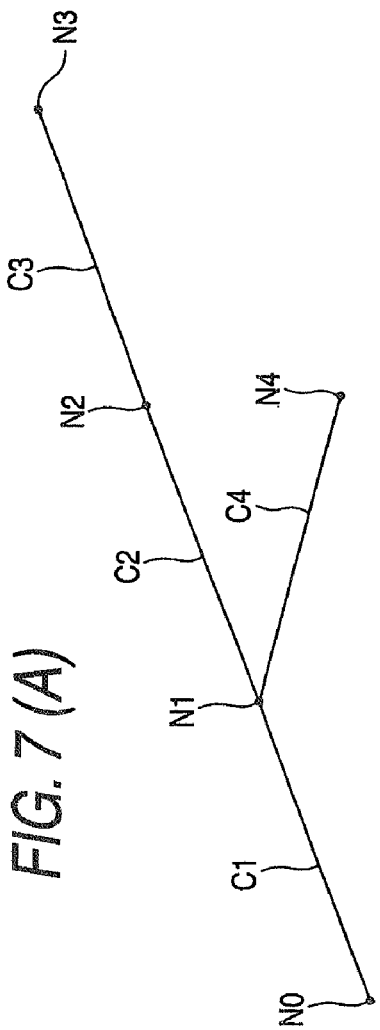
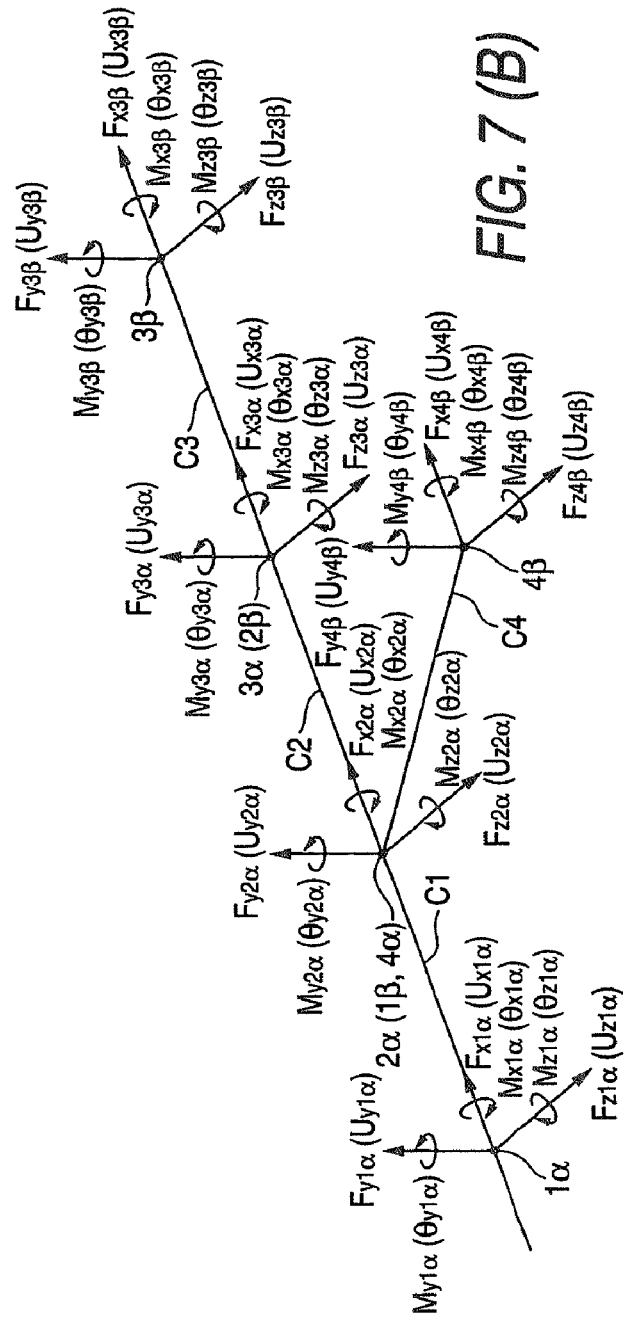
FIG. 7 (A)
FIG. 7 (B)

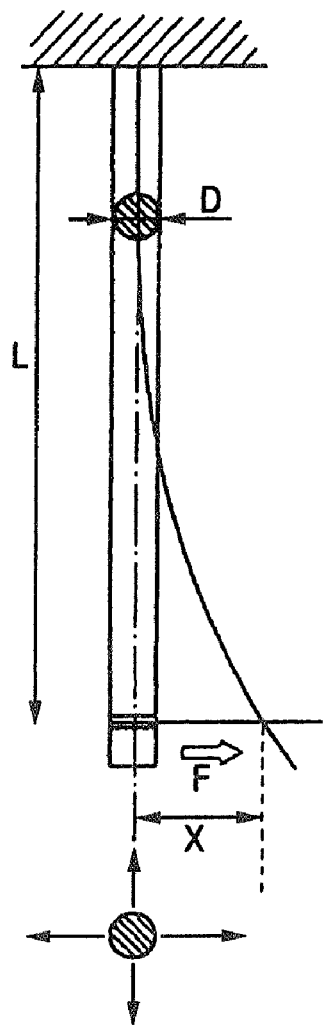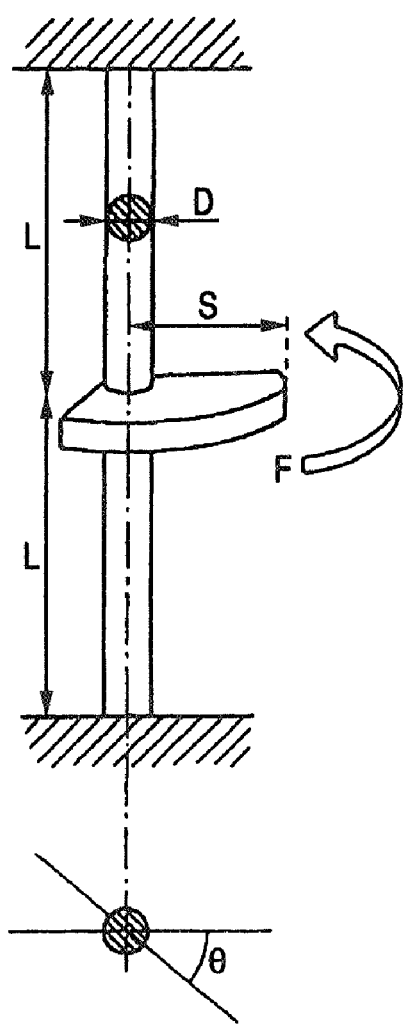
FIG. 8 (A)  FIG. 8 (B)

θ1-θ3: TWIST ANGLE

θ11, θ12: TWIST ANGLE

US 7,529,638 B2

METHOD OF CALCULATING TWIST ANGLE IN WIRE-LIKE STRUCTURE, APPARATUS FOR THE SAME, AND PROGRAM FOR THE SAME

TECHNICAL FIELD

The present invention relates to a method of, with using a computer, calculating a twist angle of a wire member and/or a clamp which is produced when a wire-like structure is deformed to a predetermined shape, the wire-like structure including: a main wire member; a sub wire member that branches off from the main wire member; and/or the clamp that is attached to the main wire member, and also to an apparatus for the method, and a program for the method.

BACKGROUND ART

Recently, various electrical components are mounted on a vehicle or the like. Such electrical components are connected by a wire-like structure called a wire harness in which a plurality of electric wires or communication lines are bundled by a bundling member such as an insulation lock or a protective member such as a tape. Such a wire harness is designed so as to be laid in a predetermined three-dimensional space, and produced while being developed two-dimensionally on a jig plate.

FIGS. 1(A) and 1(B) are views respectively showing shapes of a wire harness in designing and producing processes. As shown in FIG. 1(A), usually, the wire harness is designed so that it has a plurality of branch wires $1b1$ to $1b4$ which branch off from a trunk wire $1a$ in different directions, clamps $2a$ to $2g$ and the like are attached to end portions of the wires or an intermediate points (in place of the clamps, grommets may be used or connectors may be attached to the end portions), and the wire harness is laid in a predetermined three-dimensional space such as a door of a vehicle or a floor. However, the wire harness which has been designed under the assumption of a three-dimensional space as described above is produced while being developed on a two-dimensional jig plate as shown in FIG. 1(B). In a developed state, therefore, the branch wires $1b1$ to $1b4$ which branch off in different directions, and the clamps $2a$ to $2g$ produce a twist with respect to the trunk wire $1a$. This will be described with reference to FIG. 2.

FIGS. 2(A) and 2(B) are views illustrating a twist angle in a wire harness to which the invention is to be applied. In a state where the trunk wire $1a$ of the wire harness which has been designed under the assumption of a three-dimensional space is linearly stretched without being twisted as shown in FIG. 2(A), for example, the branch wires $1b1$ and $1b2$ branch off in different directions by an angle $\theta$ as viewed from the front side as shown in FIG. 2(B). Similarly, also two clamps (mainly attached to intermediate portions of the trunk wire) which are not shown in the figures sometimes branch off in different directions by the angle $\theta$ as shown in FIG. 2(B). In the case of the clamps, however, the angle $\theta$ is an angle formed by straight lines v1, v2 connecting twist application points p1, p2 due to the two clamps and the center axis of the trunk wire $1a$, i.e., the two clamp rotation axes as shown in FIGS. 2(A) and 2(B). Moreover, a branch wire and a clamp may possibly form the angle $\theta$ in a similar manner.

In a process of producing the wire harness, all the trunk wire, the branch wires, and the clamps constituting the wire harness are developed on a jig plate which is basically a two-dimensional plane. In a process of producing the wire harness, when the trunk wire $1a$ and the branch wire $1b1$ are extended along the jig plate to be set as a reference, therefore, the branch wire $1b2$ is twisted by a degree corresponding to the angle $\theta$. In the description, such an angle $\theta$ is referred to as the twist angle.

Usually, a trunk wire is thicker than a branch wire. Alternatively, these wires may have the same thickness, or may have inverse thickness relationships. A trunk wire, and a branch wire may be otherwise called, or for example a main wire member and a sub wire member (branch wire member), respectively. In the description, a clamp means a support member for a wire harness, such as a connector or a clip.

As prior art literature information related to the invention of the application, there is the following literature:

[Non-patent Reference 1]

"Matrix finite element method", B. Nath, Brain Books Publishing Co., Ltd., Aug. 10, 1978, p. 7-15

DISCLOSURE OF THE INVENTION

For accurate design of a jig plate and efficient production of a wire harness, it is essential to correctly grasp such a twist angle before design of a jig plate and production of a wire harness. However, a wire harness is configured by bundling a plurality of wires, and hence has peculiar material and shape properties, or peculiar physical properties. It has been considered that it is difficult to correctly obtain a twist angle in such a wire harness. Therefore, an effective technique for correctly obtaining a twist angle in a wire harness has not been established, and it has been requested to realize such a technique.

In view of the above-mentioned present status, it is an object of the invention to provide a method of calculating a twist angle which can calculate easily and correctly a twist angle in a wire harness, and which is effective in accurate design of a jig plate and efficient production of a wire harness, an apparatus for the method, and a program for the method.

A method of calculating a twist angle which has been conducted in order to attain the object is a method of calculating a twist angle in a wire-like structure in which a twist angle of a sub wire bundle and/or a clamp is calculated with using a computer, the twist angle being produced when the wire-like structure is deformed from a predetermined reference shape to a deformed shape that is different from the reference shape, the wire-like structure including: a main wire bundle; the sub wire bundle that branches off from the main wire bundle; and/or the clamp that is attached to the main wire bundle, wherein the method includes: a deformed shape model producing step of producing a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle; a reference shape model producing step of producing a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle; a superimposition calculating step of, with using a finite element method, calculating a shape obtained by deforming the reference shape model and superimposing the deformed reference shape model on the deformed shape model, while referring shape and material properties of the wire-like structure; and a twist angle calculating step of, after the superimposition calculating step, calculating an angle formed by the reference axis, and the clamp axis and/or the virtual clamp axis, as the twist angle.

A method of calculating a twist angle which has been conducted in order to attain the object is a method in which, in order to calculate the virtual clamp axis, the method further includes: a tangent plane producing step of producing a tangent plane which contains both a tangent vector with respect to the sub wire bundle, and a tangent vector with respect to the main wire bundle, the tangent vectors starting at the sub wire bundle branch node; and a virtual clamp axis calculating step of calculating a vector as the virtual clamp axis, the vector starting in the tangent plane at the sub wire bundle branch node and being perpendicular to the tangent vector with respect to the main wire bundle.

A method of calculating a twist angle which has been conducted in order to attain the object is a method in which, the method further includes a displaying step of displaying the clamp axis and/or the virtual clamp axis together with the reference shape model, while returning by a degree corresponding to the twist angle.

A method of calculating a twist angle which has been conducted in order to attain the object is a method in which, the reference shape corresponds to a shape obtained when the wire-like structure is developed on a jig plate, and the deformed shape corresponds to a shape obtained when the wire-like structure is attached to a predetermined portion.

A method of calculating a twist angle which has been conducted in order to attain the object is a method of calculating a twist angle in a wire-like structure in which twist angles of sub wire bundles are calculated with using a computer, the twist angles being produced when a wire-like structure is deformed to a predetermined shape, the wire-like structure being designed so as to be laid in a predetermined portion, and including: a main wire bundle; and the sub wire bundles that branch off from the main wire bundle, wherein the method includes: a finite element model producing step of producing a finite element model of the wire-like structure while assuming that the wire-like structure is an elastic body in which a plurality of beam elements are coupled together; a deforming step of deforming the wire-like structure to a reference shape in which the main wire bundle exists in a predetermined plane, by applying shape and material properties and restraint conditions of the wire-like structure to the finite element model; and a twist angle calculating step of calculating angles which are formed by the sub wire bundles with respect to the plane, as the twist angles.

A method of calculating a twist angle which has been conducted in order to attain the object is a method in which, the restraint conditions corresponding to the reference shape are set so that the main wire bundle is linearly stretched without being twisted.

A method of calculating a twist angle which has been conducted in order to attain the object is a method in which, the plane is a reference plane in which a jig plate that is to be used in production of the wire-like structure is supposed.

A method of calculating a twist angle which has been conducted in order to attain the object is a method in which, among all wire bundles constituting the wire-like structure, the main wire bundle has a largest diameter.

A method of calculating a twist angle which has been conducted in order to attain the object is a method in which, the restraint conditions are set so that also a wire bundle which, among the sub wire bundles, is next in thickness to the main wire bundle exists in the reference plane.

A method of calculating a twist angle which has been conducted in order to attain the object is a method in which, the wire-like structure includes a clamp which is attached to the main wire bundle, and which can produce a twist, and also an angle which is formed by a rotation axis of the clamp with respect to the plane is calculated as the twist angle.

A method of calculating a twist angle which has been conducted in order to attain the object is a method in which, the wire-like structure includes, in place of the sub wire bundles, a clamp which is attached to the main wire bundle, and which can produce a twist, and also an angle which is formed by a rotation axis of the clamp, in place of the sub wire bundles, with respect to the plane is calculated as the twist angle.

An apparatus for calculating a twist angle which has been conducted in order to attain the object is an apparatus for calculating a twist angle in a wire-like structure in which a twist state of a sub wire bundle and/or a clamp is calculated, the twist angle being produced when the wire-like structure is deformed from a predetermined reference shape to a deformed shape that is different from the reference shape, the wire-like structure including: a main wire bundle; the sub wire bundle that branches off from the main wire bundle; and/or the clamp that is attached to the main wire bundle, wherein the apparatus includes: a deformed shape model producing unit for producing a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle; a reference shape model producing unit for producing a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle; a superimposition calculating unit for, with using a finite element method, calculating a shape obtained by deforming the reference shape model and superimposing the deformed reference shape model on the deformed shape model, while referring shape and material properties of the wire-like structure; and a twist angle calculating unit for, after calculation by the superimposition calculating unit, calculating an angle formed by the reference axis, and the clamp axis and/or the virtual clamp axis, as the twist angle.

A program for calculating a twist angle which has been conducted in order to attain the object is a program for calculating a twist angle in a wire-like structure wherein, in order to calculate a twist state of a sub wire bundle and/or a clamp, the twist angle being produced when the wire-like structure is deformed from a predetermined reference shape to a deformed shape that is different from the reference shape, the wire-like structure including: a main wire bundle; the sub wire bundle that branches off from the main wire bundle; and/or the clamp that is attached to the main wire bundle, the program causes a computer to function as: a deformed shape model producing unit for producing a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle; a reference shape model producing unit for producing a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle; a superimposition calculating unit for, with using a finite element method, calculating a shape obtained by deforming the reference shape model and superimposing the deformed reference shape model on the deformed shape model, while referring shape and material properties of the wire-like structure; and a twist angle calculating unit for, after calculation by the superimposition calculating unit, calculating an angle formed by the reference axis, and the clamp axis and/or the virtual clamp axis, as the twist angle.

A method of calculating a twist angle which has been conducted in order to attain the object is a method of calculating a twist angle in a wire-like structure in which a twist angle of a clamp attached to a sub wire member that branches off from a main wire member, as viewed from a side of the main wire member is calculated with using a computer, wherein the method includes: a main wire member deformed shape model producing step of producing a main wire member deformed shape model in which a deformed shape of the main wire member is expressed as a coupled member of a plurality of beam elements, and a branch axis for obtaining a twist angle of the sub wire member is added to a wire member branch node on the main wire member; a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node; a main wire member angle calculating step of, with using a finite element method, calculating a first twist angle while referring physical properties of the wire-like structure, the first twist angle being an angle which is formed by the first reference axis and the branch axis when the main wire member reference shape model is deformed and then superimposed on the main wire member deformed shape model; a sub wire member deformed shape model producing step of producing a sub wire member deformed shape model in which a deformed shape of the sub wire member is expressed as a coupled member of a plurality of beam elements, and a clamp axis for obtaining a twist angle of the clamp is added to a clamp attachment node on the sub wire member; a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis; a sub wire member angle calculating step of, with using a finite element method, calculating a second twist angle while referring physical properties of the wire-like structure, the second twist angle being an angle which is formed by the second reference axis and the clamp axis when the sub wire member reference shape model is deformed and then superimposed on the sub wire member deformed shape model; and a twist angle calculating step of correcting the second twist angle on the basis of the first twist angle to obtain an angle formed by the first reference axis and the clamp axis.

A method of calculating a twist angle which has been conducted in order to attain the object is a method of calculating a twist angle in a wire-like structure in which a twist angle of a second sub wire member branching off from a sub wire member that branches off from a main wire member, as viewed from a side of the main wire member is calculated with using a computer, wherein the method includes: a main wire member deformed shape model producing step of producing a main wire member deformed shape model in which a deformed shape of the main wire member is expressed as a coupled member of a plurality of beam elements, and a first branch axis for obtaining a twist angle of the sub wire member is added to a wire member branch node on the main wire member; a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the first branch axis is added to a position corresponding to the wire member branch node; a main wire member angle calculating step of, with using a finite element method, calculating a first twist angle while referring physical properties of the wire-like structure, the first twist angle being an angle which is formed by the first reference axis and the first branch axis when the main wire member reference shape model is deformed and then superimposed on the main wire member deformed shape model; a sub wire member deformed shape model producing step of producing a sub wire member deformed shape model in which a deformed shape of the sub wire member is expressed as a coupled member of a plurality of beam elements, and a second branch axis for obtaining a twist angle of the second sub wire member is added to a second wire member branch node on the sub wire member; a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the second branch axis is added to a position corresponding to the second wire member branch node; a main wire member angle calculating step of, with using a finite element method, calculating a second twist angle while referring physical properties of the wire-like structure, the second twist angle being an angle which is formed by the second reference axis and the second branch axis when the sub wire member reference shape model is deformed and then superimposed on the sub wire member deformed shape model; and a twist angle calculating step of correcting the second twist angle on the basis of the first twist angle to obtain an angle formed by the first reference axis and the second branch axis.

An apparatus for calculating a twist angle which has been conducted in order to attain the object is an apparatus for calculating a twist angle in a wire-like structure in which a twist angle of a clamp attached to a sub wire member that branches off from a main wire member, as viewed from a side of the main wire member is calculated with using a computer, wherein the apparatus includes: a main wire member deformed shape model producing unit for producing a main wire member deformed shape model in which a deformed shape of the main wire member is expressed as a coupled member of a plurality of beam elements, and a branch axis for obtaining a twist angle of the sub wire member is added to a wire member branch node on the main wire member; a main wire member reference shape model producing unit for producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node; a main wire member angle calculating unit for, with using a finite element method, calculating a first twist angle while referring physical properties of the wire-like structure, the first twist angle being an angle which is formed by the first reference axis and the branch axis when the main wire member reference shape model is deformed and then superimposed on the main wire member deformed shape model; a sub wire member deformed shape model producing unit for producing a sub wire member deformed shape model in which a deformed shape of the sub wire member is expressed as a coupled member of a plurality of beam elements, and a clamp axis for obtaining a twist angle of the clamp is added to a clamp attachment node on the sub wire member; a sub wire member reference shape model producing unit for producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis; a sub wire member angle calculating unit for, with using a finite element method, calculating a second twist angle while referring physical properties of the wire-like structure, the second twist angle being an angle which is formed by the second reference axis and the clamp axis when the sub wire member reference shape model is deformed and then superimposed on the sub wire member deformed shape model; and a twist angle calculating unit for correcting the second twist angle on the basis of the first twist angle to obtain an angle formed by the first reference axis and the clamp axis.

A program for calculating a twist angle which has been conducted in order to attain the object is a program for calculating a twist angle in a wire-like structure wherein, in order to calculate a twist angle of a clamp attached to a sub wire member that branches off from a main wire member, as viewed from a side of the main wire member, the program causes a computer to function as: a main wire member deformed shape model producing unit for producing a main wire member deformed shape model in which a deformed shape of the main wire member is expressed as a coupled member of a plurality of beam elements, and a branch axis for obtaining a twist angle of the sub wire member is added to a wire member branch node on the main wire member; a main wire member reference shape model producing unit for producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node; a main wire member angle calculating unit for, with using a finite element method, calculating a first twist angle while referring physical properties of the wire-like structure, the first twist angle being an angle which is formed by the first reference axis and the branch axis when the main wire member reference shape model is deformed and then superimposed on the main wire member deformed shape model; a sub wire member deformed shape model producing unit for producing a sub wire member deformed shape model in which a deformed shape of the sub wire member is expressed as a coupled member of a plurality of beam elements, and a clamp axis for obtaining a twist angle of the clamp is added to a clamp attachment node on the sub wire member; a sub wire member reference shape model producing unit for producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis; a sub wire member angle calculating unit for, with using a finite element method, calculating a second twist angle while referring physical properties of the wire-like structure, the second twist angle being an angle which is formed by the second reference axis and the clamp axis when the sub wire member reference shape model is deformed and then superimposed on the sub wire member deformed shape model; and a twist angle calculating unit for correcting the second twist angle on the basis of the first twist angle to obtain an angle formed by the first reference axis and the clamp axis.

A method of calculating a twist angle which has been conducted in order to attain the object is a method of calculating a twist angle in a wire-like structure in which a twist angle of a clamp attached to a main wire member, with respect to a twist-free plane is calculated with using a computer, and then displayed, wherein the method includes: a main wire member deformed shape model producing step of producing a main wire member deformed shape model in which a deformed shape of the main wire member is expressed as a coupled member of a plurality of beam elements, and a clamp axis for expressing a twist angle of the clamp is added to a clamp attachment node on the main wire member; a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively; a twist-free plane setting step of setting the twist-free plane by connecting together the reference axes when the main wire member reference shape model is deformed and then superimposed on the main wire member deformed shape model; and a displaying step of displaying the twist-free plane together with the deformed shape and the clamp axis.

A method of calculating a twist angle which has been conducted in order to attain the object is a method in which, the method includes a second displaying step of displaying the twist-free plane together with the deformed shape, in place the displaying step.

A method of calculating a twist angle which has been conducted in order to attain the object is a method of calculating a twist angle in a wire-like structure in which twist angles of clamps attached to a main wire member and a sub wire member that branches off from the main wire member, with respect to a twist-free plane are calculated with using a computer, and then displayed, wherein the method includes: a main wire member deformed shape model producing step of producing a main wire member deformed shape model in which a deformed shape of the main wire member is expressed as a coupled member of a plurality of beam elements, and a first clamp axis for expressing a twist angle of a clamp on the main wire member is added to a clamp attachment node on the main wire member; a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and first reference axes for obtaining a first twist-free plane are added to nodes including a position corresponding to the clamp attachment node, respectively; a first twist-free plane setting step of setting the first twist-free plane by connecting together the first reference axes when the main wire member reference shape model is deformed and then superimposed on the main wire member deformed shape model; a sub wire member deformed shape model producing step of producing a sub wire member deformed shape model in which a deformed shape of the sub wire member is expressed as a coupled member of a plurality of beam elements, and a second clamp axis for expressing a twist angle of a clamp on the sub wire member is added to a clamp attachment node on the sub wire member; a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and second reference axes for obtaining a second twist-free plane are added to nodes including a position corresponding to the clamp attachment node, respectively; a second twist-free plane setting step of setting the second twist-free plane by connecting together the second reference axes when twists of the first reference axes constituting the first twist-free plane are propagated to the second reference axes, and the sub wire member reference shape model is deformed and then superimposed on the sub wire member deformed shape model; and a displaying step of displaying the first twist-free plane and the second twist-free plane together with the deformed shape, the first clamp axis, and the second clamp axis.

An apparatus for calculating a twist angle which has been conducted in order to attain the object is an apparatus for calculating a twist angle in a wire-like structure in which a twist angle of a clamp attached to a main wire member, with respect to a twist-free plane is calculated with using a computer, and then displayed, wherein the apparatus includes: a main wire member deformed shape model producing unit for producing a main wire member deformed shape model in which a deformed shape of the main wire member is expressed as a coupled member of a plurality of beam elements, and a clamp axis for expressing a twist angle of the clamp is added to a clamp attachment node on the main wire member; a main wire member reference shape model producing unit for producing a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively; a twist-free plane setting unit for setting the twist-free plane by connecting together the reference axes when the main wire member reference shape model is deformed and then superimposed on the main wire member deformed shape model; and a displaying unit for displaying the twist-free plane together with the deformed shape and the clamp axis.

A program for calculating a twist angle which has been conducted in order to attain the object is a program for calculating a twist angle in a wire-like structure wherein, in order to calculate and display a twist angle of a clamp attached to a main wire member, the program causes a computer to function as: a main wire member deformed shape model producing unit for producing a main wire member deformed shape model in which a deformed shape of the main wire member is expressed as a coupled member of a plurality of beam elements, and a clamp axis for expressing a twist angle of the clamp is added to a clamp attachment node on the main wire member; a main wire member reference shape model producing unit for producing a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively; a twist-free plane setting unit for setting the twist-free plane by connecting together the reference axes when the main wire member reference shape model is deformed and then superimposed on the main wire member deformed shape model; and a displaying unit for displaying the twist-free plane together with the deformed shape and the clamp axis.

According to the exemplary embodiments of the present invention, a deformed shape model is produced in which a main wire member of a wire-like structure is expressed as a coupled member of a plurality of beam elements so as to correspond to a desired deformed shape, and a clamp axis for obtaining a twist angle of a clamp, and/or a virtual clamp axis for obtaining a twist angle of a sub wire member is added to each of a clamp attachment node and/or sub wire member branch node of the main wire member, and a reference shape model is produced in which the main wire member of the wire-like structure is expressed as a coupled member of a plurality of beam elements so as to correspond to the reference shape that is straightly stretched without being twisted, and a predetermined reference axis is added to each of the clamp attachment node and/or sub wire member branch node of the main wire member. Next, while referring to physical properties of the wire-like structure, a shape obtained by deforming the reference shape model and superimposing the deformed reference shape model on the deformed shape model is calculated with using a finite element method. In accordance with the superimposition, also the reference axis of the reference shape model is rotated. An angle formed by the reference axis at the timing when the superimposition is ended, and the clamp axis of the deformed shape model and/or the virtual clamp axis is calculated as a twist angle. When the superimposing process is conducted with using a finite element method as described above, a twist angle of a sub wire member and/or a clamp which is hardly obtained in the conventional art can be calculated easily and correctly.

According to an exemplary embodiment of the present invention, a tangent plane which contains both a tangent vector with respect to the sub wire member, and a tangent vector with respect to the main wire member, the tangent vectors starting at the sub wire member branch node is produced, a vector which starts in the tangent plane at sub wire branch node, and which is perpendicular to the tangent vector with respect to the main wire member is calculated as the virtual clamp axis, and also the twist angle of the sub wire member is expressed with using the virtual clamp axis. When such a virtual clamp axis is calculated, with respect to also the sub wire member, a twist angle can be obtained in the same process procedure as that in the case of a clamp.

According to an exemplary embodiment of the present invention, the clamp axis and/or the virtual clamp axis are displayed with being superimposed on the reference shape model, while returning by a degree corresponding to the calculated twist angle. Therefore, the twist angles can be grasped visually and intuitively.

According to an exemplary embodiment of the present invention, the reference shape corresponds to a shape obtained when the wire-like structure is developed on a jig plate, and the deformed shape corresponds to a shape obtained when the wire-like structure is attached to a predetermined portion. Therefore, the invention is effective in design of a jig plate which matches the actual state, efficient production of a wire harness, and the like.

According to an exemplary embodiment of the present invention, a finite element model of a wire-like structure is produced while assuming that the wire-like structure is an elastic body in which a plurality of beam elements are coupled together, physical properties and restraint conditions of the wire-like structure are applied to the finite element model, and the wire-like structure which is designed so as to be laid in a predetermined portion is deformed to a reference shape in which the main wire member exists in a predetermined plane. Then, an angle which is formed by the sub wire member with respect to the plane is calculated as a twist angle. As described above, a finite element model is produced, a designed shape is deformed to a reference shape in which the main wire member exists in a predetermined plane, and an angle which is formed by the sub wire member at the timing of the deformation with respect to the plane is obtained as a twist angle. Therefore, it is possible to clearly grasp a twist angle of a sub wire member which is hardly correctly grasped in the conventional art.

According to an exemplary embodiment of the present invention, the restraint conditions are set so that the main wire member is linearly stretched without being twisted.

According to an exemplary embodiment of the present invention, the restraint conditions are set so that the main wire member is laid in a reference plane in which a jig plate that is to be used in production of the wire-like structure is supposed, an angle of the sub wire member with respect to the reference plane is obtained, and a twist angle is calculated with using the angle.

According to an exemplary embodiment of the present invention, the main wire member which has the largest diameter among all wire members constituting the wire-like structure exists in the reference plane. A twist angle of another wire member is calculated with respect to the reference plane.

According to an exemplary embodiment of the present invention, the restraint conditions are set so that also a wire member which, among the sub wire members, is next in thickness to the main wire member exists in the reference plane. Therefore, both the thickest wire member and the next thickest wire member exist in the reference plane. A twist angle of another wire member is calculated with respect to the reference plane.

According to an exemplary embodiment of the present invention, in the reference shape, twist angles of the sub wire member and the clamp with respect to the main wire member are calculated.

According to an exemplary embodiment of the present invention, in the reference shape, a twist angle of the clamp with respect to the main wire member is calculated.

According to an exemplary embodiment of the present invention, a main wire member deformed shape model is produced in which a deformed shape of a main wire member is expressed as a coupled member of a plurality of beam elements, and a branch axis for obtaining a twist angle of a sub wire member is added to a wire member branch node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node. Next, a first twist angle which is an angle formed by the first reference axis and the branch axis when the main wire member reference shape model is deformed and then superimposed on the main wire member deformed shape model is calculated with using a finite element method. A sub wire member deformed shape model is produced in which a deformed shape of the sub wire member is expressed as a coupled member of a plurality of beam elements, and a clamp axis for obtaining a twist angle of a clamp is added to a clamp attachment node on the sub wire member, and a sub wire member reference shape model is produced in which a wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis. Next, a second twist angle that is an angle which is formed by the second reference axis and the clamp axis when the sub wire member reference shape model is deformed and then superimposed on the sub wire member deformed shape model is calculated with using a finite element method. The second twist angle is corrected on the basis of the first twist angle, and an angle formed by the first reference axis and the clamp axis is obtained.

According to an exemplary embodiment of the present invention, a main wire member deformed shape model is produced in which a deformed shape of a main wire member is expressed as a coupled member of a plurality of beam elements, and a first branch axis for obtaining a twist angle of a sub wire member is added to a wire member branch node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the first branch axis is added to a position corresponding to a wire member branch node. Next, a first twist angle that is an angle which is formed by the first reference axis and the first branch axis when the main wire member reference shape model is deformed and then superimposed on the main wire member deformed shape model is calculated with using a finite element method. Furthermore, a sub wire member deformed shape model is produced in which a deformed shape of the sub wire member is expressed as a coupled member of a plurality of beam elements, and a second branch axis for obtaining a twist angle of a second sub wire member is added to a second wire member branch node on the sub wire member, and a sub wire member reference shape model is produced in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the second branch axis is added to a position corresponding to the second wire member branch node. Next, a second twist angle that is an angle which is formed by the second reference axis and the second branch axis when the sub wire member reference shape model is deformed and then superimposed on the sub wire member deformed shape model is calculated with using a finite element method. The second twist angle is corrected on the basis of the first twist angle, and an angle formed by the first reference axis and the second branch axis is obtained.

According to an exemplary embodiment of the present invention, a main wire member deformed shape model is produced in which a deformed shape of a main wire member is expressed as a coupled member of a plurality of beam elements, and a clamp axis for expressing a twist angle of a clamp is added to a clamp attachment node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and reference axes for obtaining a twist-free plane are added to nodes including a position corresponding to the clamp attachment node, respectively. Furthermore, the twist-free plane is set by connecting together the reference axes when the main wire member reference shape model is deformed and then superimposed on the main wire member deformed shape model. The twist-free plane is displayed together with the deformed shape and the clamp axis.

According to an exemplary embodiment of the present invention, a main wire member deformed shape model is produced in which a deformed shape of a main wire member is expressed as a coupled member of a plurality of beam elements, and a first clamp axis for expressing a twist angle of a clamp on the main wire member is added to a clamp attachment node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and first reference axes for obtaining a first twist-free plane are added to nodes including a position corresponding to the clamp attachment node, respectively. Next, the first twist-free plane is set by connecting together the first reference axes when the main wire member reference shape model is deformed and then superimposed on the main wire member deformed shape model.

Furthermore, a sub wire member deformed shape model is produced in which a deformed shape of the sub wire member is expressed as a coupled member of a plurality of beam elements, and a second clamp axis for expressing a twist angle of a clamp on the sub wire member is added to a clamp attachment node on the sub wire member, and a sub wire member reference shape model is produced in which the sub wire member is expressed as a coupled member of a plurality of beam elements so as to correspond to a sub wire member reference shape that is a shape obtained by straightly stretching the sub wire member without being twisted, and second reference axes for obtaining a second twist-free plane are added to nodes including a position corresponding to the clamp attachment node, respectively. Next, the second twist-free plane is set by connecting together the second reference axes when twists of the first reference axes constituting the first twist-free plane are propagated to the second reference axes, and the sub wire member reference shape model is deformed and then superimposed on the sub wire member deformed shape model. Then, the first twist-free plane and the second twist-free plane are displayed together with the deformed shape, the first clamp axis, and the second clamp axis.

According to an exemplary embodiment of the present invention, a deformed shape model is produced in which a main wire member of a wire-like structure is expressed as a coupled member of a plurality of beam elements so as to correspond to a desired deformed shape, and a clamp axis for obtaining a twist angle of a clamp, and/or a virtual clamp axis for obtaining a twist angle of a sub wire member is added to each of a clamp attachment node and/or sub wire member branch node of the main wire member, and a reference shape model is produced in which the main wire member of the wire-like structure is expressed as a coupled member of a plurality of beam elements so as to correspond to the reference shape that is straightly stretched without being twisted, and elongating in the same direction is added to each of the clamp attachment node and/or sub wire member branch node of the main wire member. Next, while referring to physical properties of the wire-like structure, a shape obtained by deforming the reference shape model and superimposing the deformed reference shape model on the deformed shape model is calculated with using a finite element method. In accordance with the superimposition, also the reference axis of the reference shape model is rotated. An angle formed by the reference axis at the timing when the superimposition is ended, and the clamp axis of the deformed shape model and/or the virtual clamp axis is calculated as a twist angle. When the superimposing process is conducted with using a finite element method as described above, a twist angle of a sub wire member and/or a clamp which is hardly obtained in the conventional art can be calculated easily and correctly. Therefore, the inventions are effective in accurate design of a jig plate, efficient production of a wire harness, and the like.

According to an exemplary embodiment of the present invention, a tangent plane which contains both a tangent vector with respect to the sub wire member, and a tangent vector with respect to the main wire member, the tangent vectors starting at the sub wire member branch node is produced, a vector which starts in the tangent plane at sub wire branch node, and which is perpendicular to the tangent vector with respect to the main wire member is calculated as the virtual clamp axis, and also the twist angle of the sub wire member is expressed with using the virtual clamp axis. When such a virtual clamp axis is calculated, with respect to also the sub wire member, a twist angle can be obtained in the same process procedure as that in the case of a clamp. Therefore, the efficiency of the procedure of the process of calculating a twist angle is enhanced.

According to an exemplary embodiment of the present invention, the clamp axis and/or the virtual clamp axis are displayed with being superimposed on the reference shape model, while returning by a degree corresponding to the calculated twist angle. Therefore, the twist angles can be grasped visually and intuitively. Consequently, the invention is effective in more accurate design of a jig plate, more efficient production of a wire harness, and the like.

According to an exemplary embodiment of the present invention, the reference shape corresponds to a shape obtained when the wire-like structure is developed on a jig plate, and the deformed shape corresponds to a shape obtained when the wire-like structure is attached to a predetermined portion. Therefore, the invention is effective in design of a jig plate which matches the actual state, efficient production of a wire harness, and the like.

According to an exemplary embodiment of the present invention, a finite element model of a wire-like structure is produced while assuming that the wire-like structure is an elastic body in which a plurality of beam elements are coupled together, physical properties and restraint conditions of the wire-like structure are applied to the finite element model, and the wire-like structure which is designed so as to be laid in a predetermined portion is deformed to a reference shape in which the main wire member exists in a predetermined plane. Then, an angle which is formed by the sub wire member with respect to the plane is calculated as a twist angle. Therefore, it is possible to clearly grasp a twist angle of a sub wire member which is hardly correctly grasped in the conventional art. Consequently, the invention is effective in accurate design of a jig plate, efficient production of a wire harness, and the like.

According to an exemplary embodiment of the present invention, the restraint conditions are set so that the main wire member is linearly stretched without being twisted. Therefore, the invention is effective in more accurate design of a jig plate, efficient production of a wire harness, and the like.

According to an exemplary embodiment of the present invention, the restraint conditions are set so that the main wire member is laid in a reference plane in which a jig plate that is to be used in production of the wire-like structure is supposed, an angle of the sub wire member with respect to the reference plane is obtained, and a twist angle is calculated with using the angle. Therefore, the invention is effective in design of a jig plate which matches the actual state that is premised on production on a jig plate, production of a wire harness, and the like.

According to an exemplary embodiment of the present invention, the main wire member which has the largest diameter among all wire members constituting the wire-like structure exists in the reference plane. Therefore, the invention is effective in design of a jig plate which further matches the actual state, more efficient production of a wire harness, and the like.

According to an exemplary embodiment of the present invention, the restraint conditions are set so that also a wire member which, among the sub wire members, is next in thickness to the main wire member exists in the reference plane. Therefore, both the thickest wire member and the next thickest wire member exist in the reference plane. A twist angle of another wire member is calculated with respect to the reference plane. Therefore, the invention is effective in design of a jig plate which further matches the actual state, more efficient production of a wire harness, and the like.

According to an exemplary embodiment of the present invention, in the reference shape, twist angles of the sub wire member and the clamp with respect to the main wire member are calculated. Therefore, the invention is effective in design of a jig plate which further matches the actual state, production of a wire harness, and the like.

According to an exemplary embodiment of the present invention, in the reference shape, a twist angle of the clamp with respect to the main wire member is calculated. Therefore, the invention is effective in design of a jig plate for a wire harness in which a large number of clamps are used, production of a wire harness, and the like.

According to an exemplary embodiment of the present invention, a main wire member deformed shape model is produced in which a deformed shape of a main wire member is expressed as a coupled member of a plurality of beam elements, and a branch axis for obtaining a twist angle of a sub wire member is added to a wire member branch node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node. Next, a first twist angle which is an angle formed by the first reference axis and the branch axis when the main wire member reference shape model is deformed and then superimposed on the main wire member deformed shape model is calculated with using a finite element method. A sub wire member deformed shape model is produced in which a deformed shape of the sub wire member is expressed as a coupled member of a plurality of beam elements, and a clamp axis for obtaining a twist angle of a clamp is added to a clamp attachment node on the sub wire member, and a sub wire member reference shape model is produced in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis. Next, a second twist angle that is an angle which is formed by the second reference axis and the clamp axis when the sub wire member reference shape model is deformed and then superimposed on the sub wire member deformed shape model is calculated with using a finite element method. The second twist angle is corrected on the basis of the first twist angle, and an angle formed by the first reference axis and the clamp axis is obtained. Therefore, it is possible to correctly calculate a twist angle of a clamp attached to a sub wire member that branches off from a main wire member, as viewed from a side of the main wire member.

According to an exemplary embodiment of the present invention, a main wire member deformed shape model is produced in which a deformed shape of a main wire member is expressed as a coupled member of a plurality of beam elements, and a first branch axis for obtaining a twist angle of a sub wire member is added to a wire member branch node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of a first branch axis is added to a position corresponding to the wire member branch node. Next, a first twist angle that is an angle which is formed by the first reference axis and the first branch axis when the main wire member reference shape model is deformed and then superimposed on the main wire member deformed shape model is calculated with using a finite element method. Furthermore, a sub wire member deformed shape model is produced in which a deformed shape of the sub wire member is expressed as a coupled member of a plurality of beam elements, and a second branch axis for obtaining a twist angle of a second sub wire member is added to a second wire member branch node on the sub wire member, and a sub wire member reference shape model is produced in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the second branch axis is added to a position corresponding to the second wire member branch node. Next, a second twist angle that is an angle which is formed by the second reference axis and the second branch axis when the sub wire member reference shape model is deformed and then superimposed on the sub wire member deformed shape model is calculated with using a finite element method. The second twist angle is corrected on the basis of the first twist angle, and an angle formed by the first reference axis and the second branch axis is obtained. Therefore, it is possible to correctly calculate a twist angle of a clamp attached to a second sub wire member branching off from a sub wire member that branches off from a main wire member, as viewed from a side of the main wire member.

According to an exemplary embodiment of the present invention, a main wire member deformed shape model is produced in which a deformed shape of a main wire member is expressed as a coupled member of a plurality of beam elements, and a clamp axis for expressing a twist angle of a clamp is added to a clamp attachment node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and reference axes for obtaining a twist-free plane are added to nodes including a position corresponding to the clamp attachment node, respectively. Furthermore, the twist-free plane is set by connecting together the reference axes when the main wire member reference shape model is deformed and then superimposed on the main wire member deformed shape model. The twist-free plane is displayed together with the deformed shape and the clamp axis. Therefore, it is possible to easily grasp a twist angle of a clamp attached onto a main wire member, with respect to a twist-free plane.

According to an exemplary embodiment of the present invention, a main wire member deformed shape model is produced in which a deformed shape of a main wire member is expressed as a coupled member of a plurality of beam elements, and a first clamp axis for expressing a twist angle of a clamp on the main wire member is added to a clamp attachment node on the main wire member, and a main wire member reference shape model is produced in which the main wire member is expressed as a coupled member of a plurality of beam elements so as to correspond to a main wire member reference shape that is a shape obtained by straightly stretching the main wire member without being twisted, and first reference axes for obtaining a first twist-free plane are added to nodes including a position corresponding to the clamp attachment node, respectively. Next, the first twist-free plane is set by connecting together the first reference axes when the main wire member reference shape model is deformed and then superimposed on the main wire member deformed shape model. Furthermore, a sub wire member deformed shape model is produced in which a deformed shape of the sub wire member is expressed as a coupled member of a plurality of beam elements, and a second clamp axis for expressing a twist angle of a clamp on the sub wire member is added to a clamp attachment node on the sub wire member, and a sub wire member reference shape model is produced in which the sub wire member is expressed as a coupled member of a plurality of beam elements so as to correspond to a sub wire member reference shape that is a shape obtained by straightly stretching the sub wire member without being twisted, and second reference axes for obtaining a second twist-free plane are added to nodes including a position corresponding to the clamp attachment node, respectively. Next, the second twist-free plane is set by connecting together the second reference axes when twists of the first reference axes constituting the first twist-free plane are propagated to the second reference axes, and the sub wire member reference shape model is deformed and then superimposed on the sub wire member deformed shape model. Then, the first twist-free plane and the second twist-free plane are displayed together with the deformed shape, the first clamp axis, and the second clamp axis. Therefore, it is possible to easily grasp twist angles of clamps attached onto a main wire member and a sub wire member branching off from the main wire member, with respect to a twist-free plane.

BRIEF DESCRIPTION OF THE DRAWINGS

FIG. 3 is a view showing relationships between typical clamps which are to be attached to a wire harness, and restrained degrees of freedom.

FIG. 7(A) is a view showing a portion of a wire harness which is formed by three beam elements and a beam element corresponding to a branch wire, and FIG. 7(B) is a view showing a state where FIG. 7(A) is expressed by the four beam elements and the beam elements are then coupled together.

FIG. 8(A) is a view showing a manner of measuring a geometrical moment of inertia and a longitudinal modulus of elasticity, and FIG. 8(B) is a view showing a manner of measuring a polar geometrical moment of inertia and a transverse modulus of elasticity.

Figure 1:
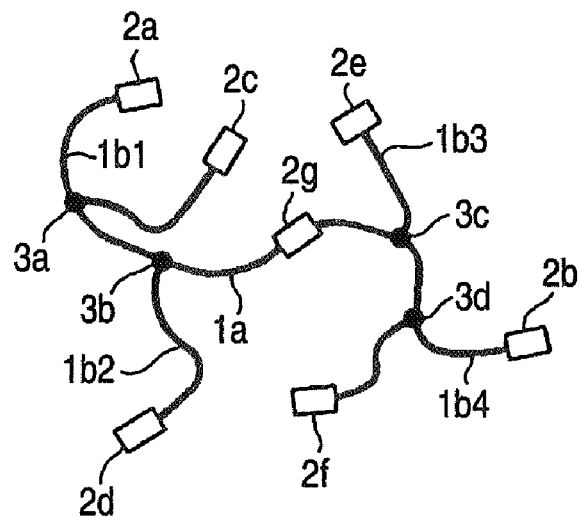
FIGS. 1(A) and 1(B) are views respectively showing shapes of a wire harness in designing and producing processes.
Figure 1:
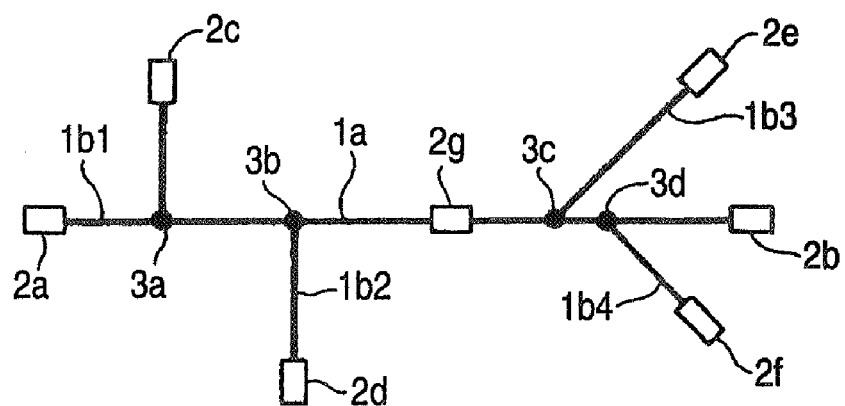
Figure 2:
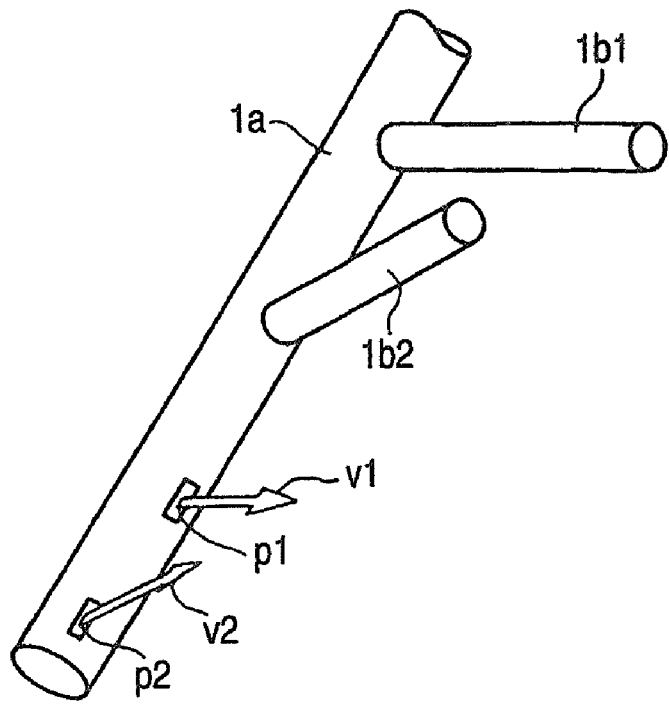
FIGS. 2(A) and 2(B) are views illustrating a twist angle in a wire harness.
Figure 2:
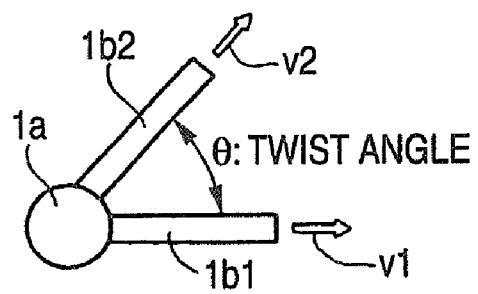

In the figures, the reference numerals designate components in the following manner:

1, 100 wire harness (wire-like structure)
1$a$, 100$a$ trunk wire
1$b$1 to 1$b$4, 100$b$ to 100$b$3 branch wire
2$a$ to 2$g$, 200$a$ to 200$g$ clamp
3$a$ to 3$d$ branch point
5 tangent plane
6 reference plane
41 microcomputer
42 input device
43 display device
44 print device
45 storage device
46 read device
47 communication interface
48 storage medium
48$a$ twist angle calculation program
49 internal bus
C0 to C7 beam element
N0 to N7 node

BEST MODE FOR CARRYING OUT THE INVENTION

Hereinafter, embodiments of the invention will be described with reference to the drawings.

First, the total shape of a wire harness to which the invention is to be applied, and typical clamps will be described with reference to FIGS. 1(A), 1(B), 2(A), 2(B) and 3. FIGS. 1(A), 1(B), 2(A) and 2(B) are views as described above, and FIG. 3 is a view showing relationships between typical clamps which are to be attached to a wire harness, and restrained degrees of freedom. Although the wire harness in the description is not restricted to that for a vehicle, a wire harness which is to be laid in a vehicle will be exemplarily described in order to understand the gist of the invention.

As shown in FIGS. 1(A), 1(B), 2(A) and 2(B), as described above, the wire harness to which the invention is to be applied has a plurality of branch wires 1$b$1 to 1$b$4 which branch off at branch points 3$a$ to 3$d$ of the trunk wire 1$a$ in different directions, and the clamps 2$a$ to 2$g$ are attached to the end portions of the wires or an intermediate point. The trunk wire 1$a$ and the branch wires 1$b$1 to 1$b$4 are basically different from each other in number and kind of constituting filament members, and hence the branch wires are different from each other also in thickness, length, elasticity, rigidity, and the like.

The wire harness, the trunk wire, and the branch wires in the embodiment correspond to the wire-like structure, the main wire member, and the sub wire members in the claims, respectively.

The clamps 2$a$ to 2$f$ are detachably fixed to predetermined positions in accordance with fixing positions and attaching manners of counter clamps for electrical components to completely restrain the end portions of the wire harness. The clamps which completely restrain the end portions are often referred also to as connectors (see FIG. 3). The clamp 2$g$ is usually attached to an intermediate portion of the wire harness to completely restrain or rotatably restrain the wire harness to a predetermined position of the body, a stay, or the like. Although only one clamp is shown, a plurality of clamps are usually attached to a wire harness. Other examples of members for restraining a wire harness are protectors and grommets.

Hereinafter, clamps will be described. Basically, clamps include long-hole clamps and round-hole clamps. A round-hole clamp is called also rotational clamp, and configured by a pedestal portion for holding a wire harness, and a support leg which is to be inserted into a mounting hole that has a round-hole shape, and that is disposed in a stay or the like. A round-hole clamp is rotatable about the Z-axis (the direction perpendicular to the attachment portion).

By contrast, a long-hole clamp is called also fixation clamp, and configured by a pedestal portion for holding a wire harness, and a support leg which is to be inserted into a mounting hole that has a long-hole shape, and that is disposed in a stay or the like. The support leg has a section shape having a long-hole shape which is substantially identical with that of the mounting hole. A long-hole clamp is nonrotatable about the Z-axis.

Furthermore, long-hole clamps and round-hole clamps include corrugated long-hole clamps and corrugated round-hole clamps which are rotatable about the X-axis (the longitudinal direction of a wire harness). Restrained degrees of freedom of such clamps in axial directions and about axes are shown in FIG. 3.

In FIG. 3, the X-, Y-, and Z-axes correspond to three perpendicular axes in a right-handed local coordinate system at nodes of a wire harness. For example, the Z-axis coincides with the clamp axis. The method of determining the relationships can be adequately changed in accordance with a used function. In the figure, also restrained degrees of freedom of branch points are shown for the purpose of reference. Although not shown in the figure, a node of a wire harness which is arbitrarily set at a point other than the above-mentioned restrained points is basically completely free. Prior to calculations of a predicted path, a reaction force, and the like, such restrained degrees of freedom are set for each node as described later.

Figure 4:
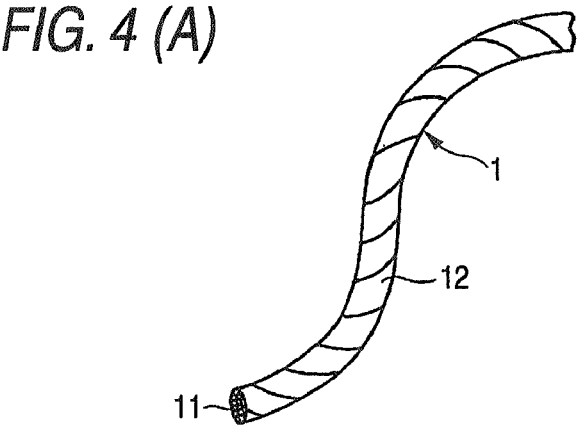
FIG. 4(A) is a view showing the appearance of a wire harness.
FIG. 4(B) is a view showing a state of digitizing the wire harness of FIG. 4(A)
FIG. 4(C) is a view expressing the wire harness of FIG. 4(A) by beam elements and nodes.
Figure 4:
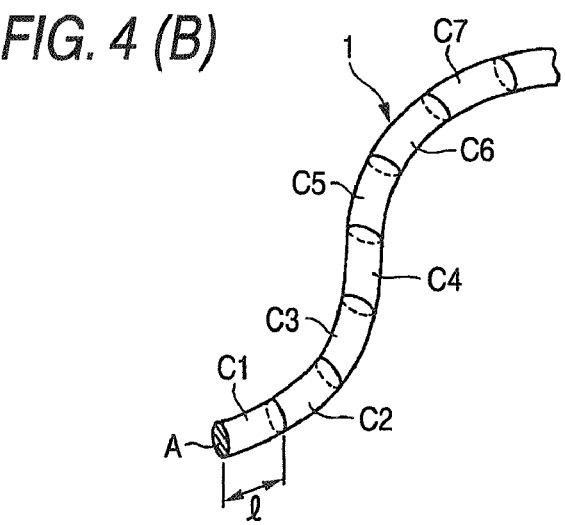
Figure 4:
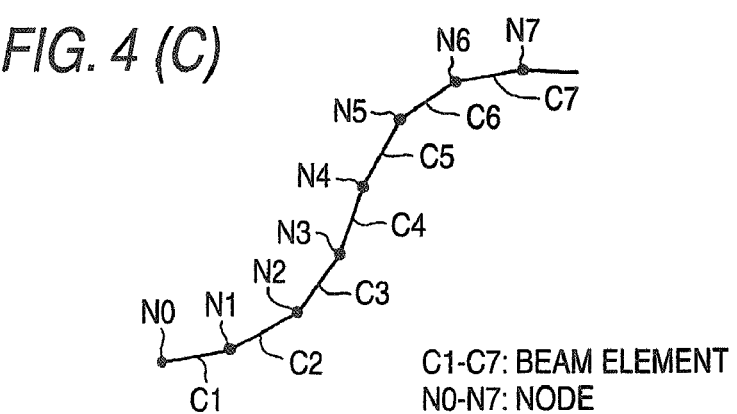
Figure 5:
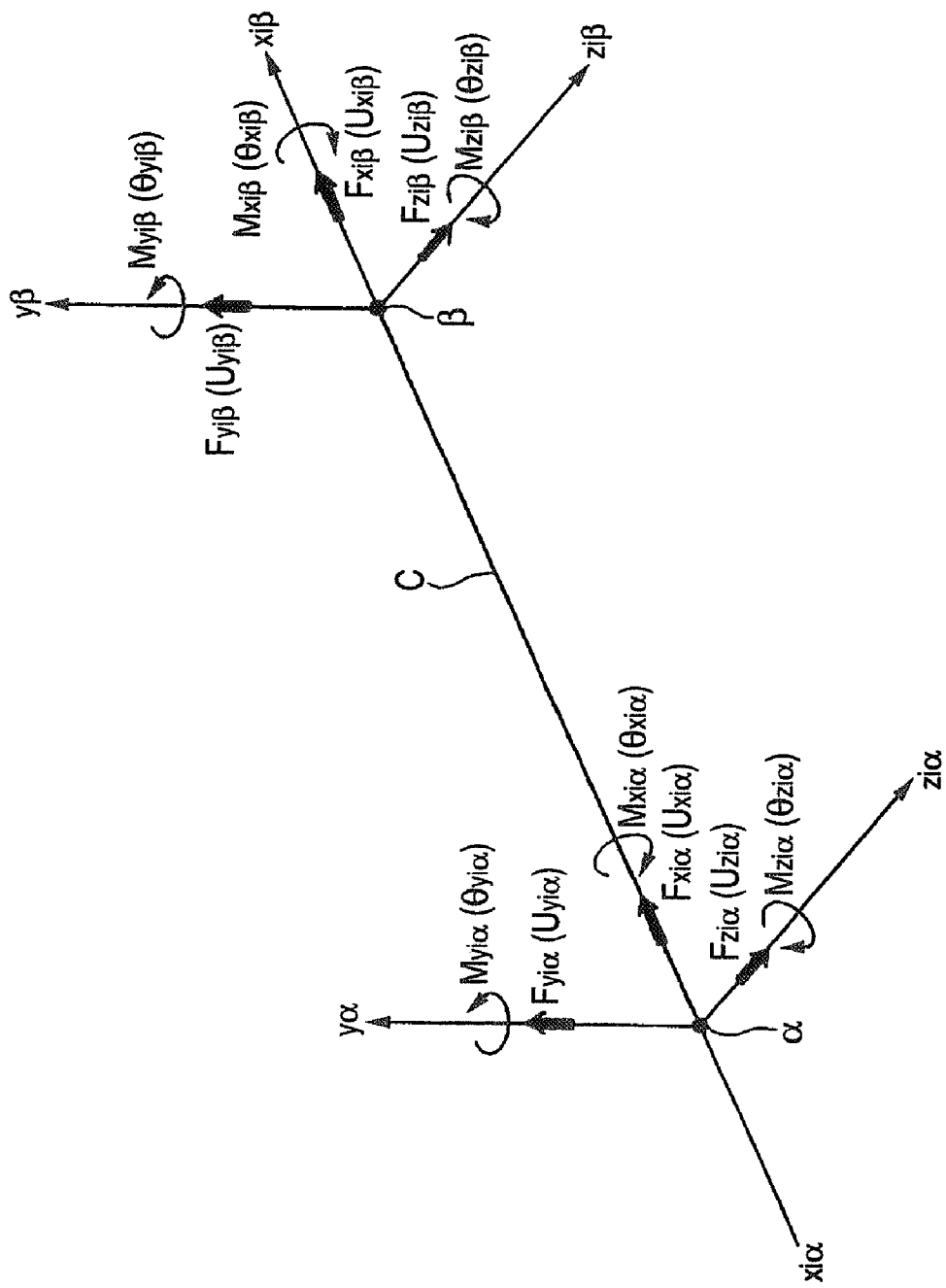
FIG. 5 is a view illustrating degrees of freedom in a wire harness expressed by beam elements and nodes.

Next, assumption conditions on which the invention is premised, a used theory, and fundamental expressions will be briefly described with reference to FIGS. 4(A)-4(C) and 5. FIG. 4(A) is a view showing the appearance of a wire harness, FIG. 4(B) is a view showing a state of digitizing the wire harness of FIG. 4(A), and FIG. 4(C) is a view expressing the wire harness of FIG. 4(A) by beam elements and nodes. FIG. 5 is a view illustrating degrees of freedom in a wire harness expressed by beam elements and nodes.

In the invention, in order to obtain the twist angle, a reference shape is first calculated by using a finite element method. In the use of the finite element method, the followings are assumed.

(1). The wire harness is assumed to be an elastic body.

(2). The wire harness is assumed to be formed by coupling beam elements together.

(3). It is assumed that linearity is maintained in each of the beam elements.

(4). The wire harness is assumed to have a uniform section (although the wire harness is assumed to have a circular section, it is not always necessary for the wire harness to have a circular section).

In the invention, when such assumptions are made, the finite element method, which is not used in the conventional art, can be applied to a wire harness.

In the embodiment, first, the wire harness is digitized. As shown in FIG. 4(A), namely, the wire harness 1 in which a plurality of electric wires 11 are bundled by a protective member such as a tape 12 can be regarded as a continuous body. Next, as shown in FIG. 4(B), the wire harness 1 is divided (digitized) into several beam elements C1, C2, C3, . . . . That is, the wire harness is similar to a single rope, and hence can be regarded as a body which is formed by coupling a finite number of beam elements.

As shown in FIG. 4(C), therefore, the wire harness can be expressed as a body in which the plural beam elements C1, C2, C3, . . . are coupled together by a plurality of nodes N1, N2, N3, . . . . Property values which are necessary for the beam elements are as follows:

length I (see FIG. 4(B)), sectional area A (see FIG. 4(B)), geometrical moment of inertia I, polar geometrical moment of inertia J (also called a twist resistance coefficient), longitudinal modulus of elasticity E, and transverse modulus of elasticity G.

Although not directly indicated in the above property values, also the density $\rho$, the Poisson's ratio $\mu$, and the like are used in order to obtain them.

In the description, the length I, the sectional area A, the geometrical moment of inertia I, the polar geometrical moment of inertia J, the longitudinal modulus of elasticity E and the transverse modulus of elasticity G, the density $\rho$, the Poisson's ratio $\mu$, and the like are referred to as physical properties.

As shown in FIG. 5, each beam element C (C1, C2, C3, . . . ) has two nodes $\alpha$ and $\beta$. In a three-dimensional space, the node $\alpha$ has three translational components and three rotational components, and is therefore provided with six degrees of freedom in total. This is applicable also to the node $\beta$. Consequently, the beam element C is provided with twelve degrees of freedom.

In the figures, the symbols indicate as follows:

Fxi: nodal force in the xi-axis of an i-th element,

Fyi: nodal force in the yi-axis of an i-th element,

Fzi: nodal force in the zi-axis of an i-th element,

Mxi: end moment about the xi-axis of an i-th element (the right-hand screw direction is set positive), Myi: end moment about the yi-axis of an i-th element (the right-hand screw direction is set positive), Mzi: end moment about the zi-axis of an i-th element (the right-hand screw direction is set positive), Uxi: displacement in the xi-axis direction of an i-th element, Uyi: displacement in the yi-axis direction of an i-th element, Uzi: displacement in the zi-axis direction of an i-th element, $\theta$xi: angular displacement about the xi-axis of an i-th element (the right-hand screw direction is set positive), $\theta$yi: angular displacement about the yi-axis of an i-th element (the right-hand screw direction is set positive), $\theta$zi: angular displacement about the zi-axis of an i-th element (the right-hand screw direction is set positive), and $\alpha$ designates a node on the left side, and $\beta$ designates a node on the right side.

In the structural mechanics involving large deformation such as a wire harness, usually, the equilibrium equation of the finite element method has the following form:

$$([K]+[K_G])\{x\}=\{F\} \quad (1)$$

where [K]: overall stiffness matrix, [$K_G$]: overall geometric stiffness matrix, {x}: displacement vector, and {F}: load vector (referred to also as force vector).

Expression (1) is algebraically formed as nonlinear simultaneous equations. When the expression is not modified, therefore, it cannot be solved in actual numerical analysis. Consequently, an increment method in which the load value is finely divided and then sequentially added is employed (this is applicable also to the case of compulsive displacement). Therefore, also the equilibrium equation of Expression (1) is expressed by the following incremental form:

$$([K]+[K_G])\{\Delta x\}=\{\Delta F\}-\{R\} \quad (1)'$$

where {$\Delta F$}: value of a load increment, {$\Delta x$}: incremental displacement in an increment step, and {R}: correction vector of a load vector.

In each increment zone, the equilibrium equation is calculated while being regarded as a linear equation. In this calculation, a generated non-equilibrium force (the vector {R} in Expression (1)') is reduced to an allowable range by the method of iteration before the process proceeds to the next step. As the series of algorithms, a known method such as the Newton-Raphson method or the arc-length method is used.

When compulsive displacement is designated as in shape prediction, the case where the overall geometric stiffness matrix [$K_G$] of the second term in the left side of the equilibrium equation is omitted is often satisfactory. In this example also, the matrix is omitted.

The overall stiffness matrix [K] of the first term in the left side is obtained by converting stiffness matrices of elements which are momentarily rewritten while changing the coordinate value in every incrementing step, and gathering the resulting matrices. Specific expression contents of an element stiffness matrix functioning as the base of the above are shown in Expression (2) below.

$$\begin{bmatrix}
\frac{AE}{l} & 0 & 0 & 0 & 0 & 0 & -\frac{AE}{l} & 0 & 0 & 0 & 0 & 0 \\
0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\
0 & 0 & \frac{12EI_y}{l^3} & 0 & \frac{6EI_y}{l^2} & 0 & 0 & 0 & -\frac{12EI_y}{l^3} & 0 & -\frac{6EI_y}{l^2} & 0 \\
0 & 0 & 0 & \frac{GJ}{l} & 0 & 0 & 0 & 0 & 0 & -\frac{GJ}{l} & 0 & 0 \\
0 & 0 & \frac{6EI_y}{l^2} & 0 & \frac{4EI_y}{l} & 0 & 0 & 0 & -\frac{6EI_y}{l^2} & 0 & \frac{2EI_y}{l} & 0 \\
0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\
\hdashline
-\frac{AE}{l} & 0 & 0 & 0 & 0 & 0 & \frac{AE}{l} & 0 & 0 & 0 & 0 & 0 \\
0 & -\frac{12EI_z}{l^3} & 0 & 0 & 0 & -\frac{6EI_z}{l^2} & 0 & \frac{12EI_z}{l^3} & 0 & 0 & 0 & \frac{6EI_z}{l^2} \\
0 & 0 & -\frac{12EI_y}{l^3} & 0 & -\frac{6EI_z}{l^2} & 0 & 0 & 0 & \frac{12EI_y}{l^3} & 0 & \frac{6EI_y}{l^2} & 0 \\
0 & 0 & 0 & -\frac{GJ}{l} & 0 & 0 & 0 & 0 & 0 & \frac{GJ}{l} & 0 & 0 \\
0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\
0 & \frac{6EI_z}{l^2} & 0 & 0 & 0 & \frac{2EI_z}{l} & 0 & \frac{6EI_z}{l^2} & 0 & 0 & 0 & \frac{4EI_z}{l}
\end{bmatrix}
\begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ \text{----} \\ U_{xi\beta} \\ U_{yi\beta} \\ U_{zi\beta} \\ \theta_{xi\beta} \\ \theta_{yi\beta} \\ \theta_{zi\beta} \end{Bmatrix}
= \begin{Bmatrix} F_{xi\alpha} \\ F_{yi\alpha} \\ F_{zi\alpha} \\ M_{xi\alpha} \\ M_{yi\alpha} \\ M_{zi\alpha} \\ \text{----} \\ F_{xi\beta} \\ F_{yi\beta} \\ F_{zi\beta} \\ M_{xi\beta} \\ M_{yi\beta} \\ M_{zi\beta} \end{Bmatrix} \quad (2)$$

The four sub-matrices are indicated by $K_i(1,1)$, $K_i(1,2)$, $K_i(2,1)$, and $K_i(2,2)$.

In Expression (2), the matrix of twelve rows and twelve columns is divided into four matrices of six rows and six columns, and the four matrices are indicated by $K_i(1, 1)$, $K_i(1, 2)$, $K_i(2, 1)$, and $K_i(2, 2)$, respectively. In the following, for the sake of simplicity, description will be made with using the matrices of six rows and six columns.

Figure 6:
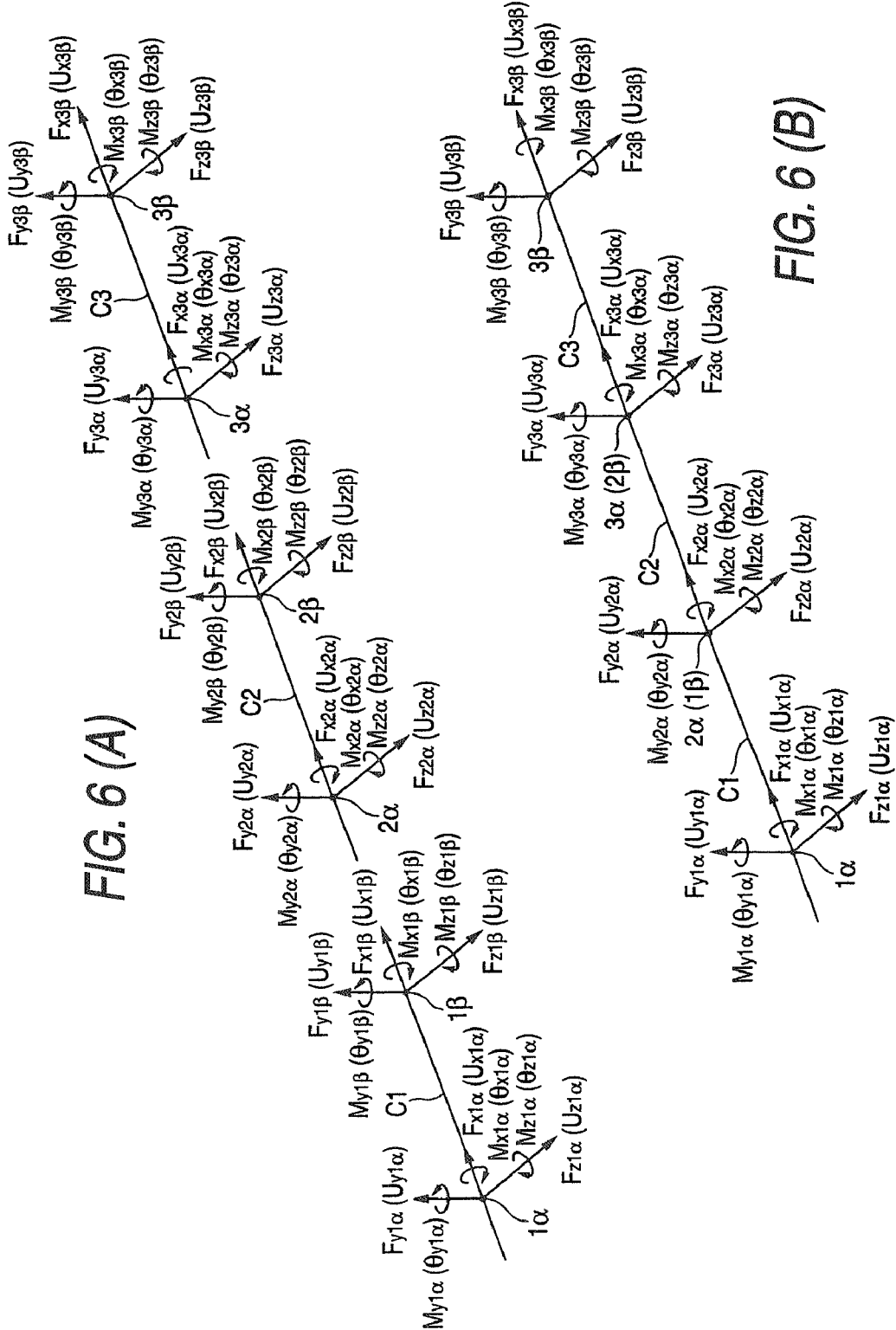
FIG. 6(A) is a view expressing a wire harness by three beam elements.
FIG. 6(B) is a view showing a state where the three beam elements in FIG. 6(A) are coupled together.

Hereinafter, matching conditions and balancing conditions will be described with reference to FIGS. 6(A)-6(B). FIG. 6(A) is a view expressing a wire harness by three beam elements, and FIG. 6(B) is a view showing a state where the three beam elements of FIG. 6(A) are coupled together.

For the sake of simplicity, the portion of the wire harness which is formed by three beam elements C1, C2, C3, and in which, as shown in FIG. 6(A), there is no branch wire will be considered. Namely, it is assumed that the portion is expressed by the three beam elements C1, C2, C3. In this case, displacement of a node 1β of the beam element C1 is equal to that of a node 2α of the beam element C2, and forces acting on the two nodes balance with each other. Similarly, displacement of a node 2β of the beam element C2 is equal to that of a node 3α of the beam element C3, and forces acting on the two nodes balance with each other. When continuity of the displacements and balancing conditions of the forces are satisfied, the beam elements C1 and C2, and the beam elements C2 and C3 can be coupled together as shown in FIG. 6(B).

In the figures, the symbols indicate as follows:
Fxi: nodal force in the xi-axis of an i-th element,
Fyi: nodal force in the yi-axis of an i-th element,
Fzi: nodal force in the zi-axis of an i-th element,
Mxi: end moment about the xi-axis of an i-th element,
Myi: end moment about the yi-axis of an i-th element,
Mzi: end moment about the zi-axis of an i-th element,
Uxi: displacement in the xi-axis direction of an i-th element,
Uyi: displacement in the yi-axis direction of an i-th element,
Uzi: displacement in the zi-axis direction of an i-th element,
θxi: angular displacement about the xi-axis of an i-th element,
θyi: angular displacement about the yi-axis of an i-th element, and
θzi: angular displacement about the zi-axis of an i-th element, and
i=1α, 1β, 2α, 2β, 3α, 3β.

For example, the beam element C1 is expressed by Expression (3) below with using the same format as Expression (2) above.

$$\begin{bmatrix} K_1(1,1) & K_1(1,2) \\ K_1(2,1) & K_1(2,2) \end{bmatrix} \begin{Bmatrix} U_{x1\alpha} \\ U_{y1\alpha} \\ U_{z1\alpha} \\ \theta_{x1\alpha} \\ \theta_{y1\alpha} \\ \theta_{z1\alpha} \\ U_{x1\beta} \\ U_{y1\beta} \\ U_{z1\beta} \\ \theta_{x1\beta} \\ \theta_{y1\beta} \\ \theta_{z1\beta} \end{Bmatrix} = \begin{Bmatrix} F_{x1\alpha} \\ F_{y1\alpha} \\ F_{z1\alpha} \\ M_{x1\alpha} \\ M_{y1\alpha} \\ M_{z1\alpha} \\ F_{x1\beta} \\ F_{y1\beta} \\ F_{z1\beta} \\ M_{x1\beta} \\ M_{y1\beta} \\ M_{z1\beta} \end{Bmatrix} \quad (3)$$

When also the beam elements C2 and C3 are expressed in the same manner as Expression (3), the beam elements C1, C2, C3 are coupled together as shown in FIG. 6(B), and continuity of the displacements and balance of the forces in the beam elements C1, C2, C3 are expressed in the same format as Expression (3) above, Expression (4) below is established.

$$\underbrace{\begin{bmatrix} K_1(1,1) & K_1(1,2) & & \\ K_1(2,1) & \boxed{K_2(1,2)} & & \\ & K_2(2,1) & \boxed{K_3(1,2)} \\ & & K_3(2,1) & K_3(2,2) \end{bmatrix}}_{[K]} \quad (4)$$

with $M_{12}$ and $M_{23}$ indicated.

$$\underbrace{\begin{Bmatrix} U_{x1\alpha} \\ U_{y1\alpha} \\ U_{z1\alpha} \\ \theta_{x1\alpha} \\ \theta_{y1\alpha} \\ \theta_{z1\alpha} \\ \hline U_{x2\alpha} \\ U_{y2\alpha} \\ U_{z2\alpha} \\ \theta_{x2\alpha} \\ \theta_{y2\alpha} \\ \theta_{z2\alpha} \\ \hline U_{x3\alpha} \\ U_{y3\alpha} \\ U_{z3\alpha} \\ \theta_{x3\alpha} \\ \theta_{y3\alpha} \\ \theta_{z3\alpha} \\ \hline U_{x3\beta} \\ U_{y3\beta} \\ U_{z3\beta} \\ \theta_{x3\beta} \\ \theta_{y3\beta} \\ \theta_{z3\beta} \end{Bmatrix}}_{\{x\}} = \underbrace{\begin{Bmatrix} F_{x1\alpha} \\ F_{y1\alpha} \\ F_{z1\alpha} \\ M_{x1\alpha} \\ M_{y1\alpha} \\ M_{z1\alpha} \\ \hline F_{x2\alpha} \\ F_{y2\alpha} \\ F_{z2\alpha} \\ M_{x2\alpha} \\ M_{y2\alpha} \\ M_{z2\alpha} \\ \hline F_{x3\alpha} \\ F_{y3\alpha} \\ F_{z3\alpha} \\ M_{x3\alpha} \\ M_{y3\alpha} \\ M_{z3\alpha} \\ \hline F_{x3\beta} \\ F_{y3\beta} \\ F_{z3\beta} \\ M_{x3\beta} \\ M_{y3\beta} \\ M_{z3\beta} \end{Bmatrix}}_{\{F\}}$$

The six rows by six columns matrices K1(1, 1), K1(1, 2), K1(2, 1), and K1(2, 2) in Expression (4) correspond to the beam element C1 as shown in Expression (3) above. Similarly, K2(1, 1), K2(1, 2), K2(2, 1), and K2(2, 2) correspond to the beam element C2, and K3(1, 1), K3(1, 2), K3(2, 1), and K3(2, 2) correspond to the beam element C3. However, the portion which is indicated by M12, and in which K1(2, 2) and K2(1, 1) overlap with each other, and that which is indicated by M23, and in which K2(2, 2) and K3(1, 1) overlap with each other are formed as portions where their constituent components are added together.

Also the case of four or more beam elements can be handled in a similar manner. In this way, it is possible to produce a finite element model of a wire harness which is divided into an arbitrary number of beam elements.

When Expression (4) above is simplified, the following is established:

$$[K]\{x\}=\{F\}.$$

An example in which such concept is applied to a wire harness having clamps that are attached to branch wires branching off from a trunk wire and to the trunk wire will be described with reference to FIGS. 7(A) and 7(B). FIG. 7(A) is a view showing a portion of a wire harness which is formed by three beam elements and a beam element corresponding to a branch wire, and FIG. 7(B) is a view showing a state where FIG. 7(A) is expressed by the four beam elements and the beam elements are then coupled together.

For the sake of simplicity, the portion of the wire harness in which, as shown in FIG. 7(A), a branch wire expressed by a beam element C4 branches off from a node N1, and which is expressed by three beam elements C1, C2, C3 will be considered. In this case also, when continuity of the displacements in the nodes and balancing conditions of the forces are satisfied, the beam elements C1 to C3 can be coupled together as shown in FIG. 7(B). The portion expressed by the three beam elements C1, C2, C3 in FIG. 7(B) is identical with that shown in FIG. 6(B), and hence duplicated description is omitted. In addition, the beam element C4 branches off from the node N1 as shown in FIG. 7(B). The beam element C4 corresponds to a clamp axis or a virtual clamp axis which will be described later.

In the figures, the symbols indicate as follows:

Fxi: force in the xi-axis of an i-th element,
Fyi: force in the yi-axis of an i-th element,
Fzi: force in the zi-axis of an i-th element,
Mxi: moment about the xi-axis of an i-th element,
Myi: moment about the yi-axis of an i-th element,
Mzi: moment about the zi-axis of an i-th element,
Uxi: displacement in the xi-axis direction of an i-th element,
Uyi: displacement in the yi-axis direction of an i-th element,
Uzi: displacement in the zi-axis direction of an i-th element,
$\theta xi$: angular displacement about the xi-axis of an i-th element,
$\theta yi$: angular displacement about the yi-axis of an i-th element, and
$\theta zi$: angular displacement about the zi-axis of an i-th element, and
$i = 1\alpha, 1\beta, 2\alpha, 2\beta, 3\alpha, 3\beta, 4\alpha, 4\beta$.

The beam element C4 is expressed by Expression (5) below.

$$\begin{bmatrix} K_4(1,1) & & K_4(1,2) \\ & & \\ & & \\ K_4(2,1) & & K_4(2,2) \end{bmatrix} \quad (5)$$

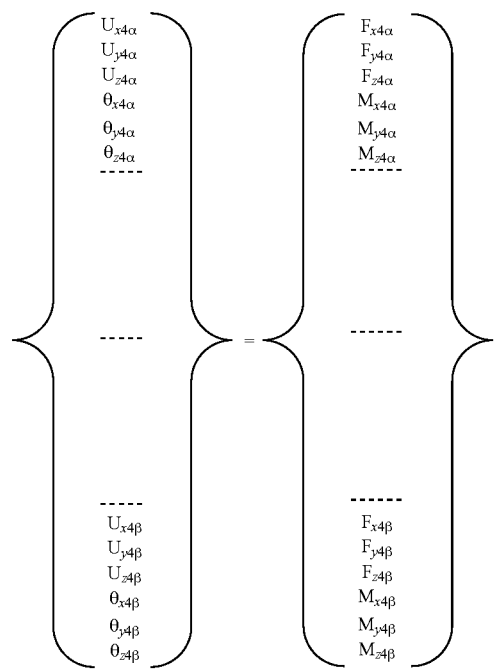

The six rows by six columns matrices $K_4(1, 1)$, $K_4(1, 2)$, $K_4(2, 1)$, and $K_4(2, 2)$ are identical with $K_1(1, 1)$, $K_1(1, 2)$, $K_1(2, 1)$, and $K_1(2, 2)$ which are described above.

When the beam elements C1 to C4 are connected together as shown in FIG. 7(B), and continuity of the displacements and balancing of the forces in the beam elements C1, C2, C3, C4 are expressed in the same format as Expression (4) above, Expression (6) below is established.

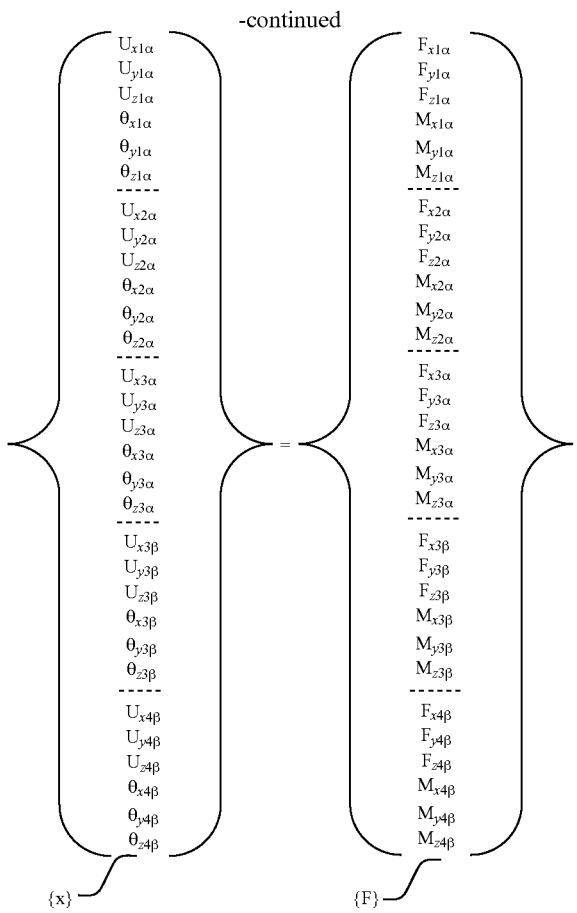

The six rows by six columns matrices $K1(1, 1)$, $K1(1, 2)$, $K1(2, 1)$, and $K1(2, 2)$ in Expression 6 correspond to the beam element C1, $K2(1, 1)$, $K2(1, 2)$, $K2(2, 1)$, and $K2(2, 2)$ correspond to the beam element C2, $K3(1, 1)$, $K3(1, 2)$, $K3(2, 1)$, and $K3(2, 2)$ correspond to the beam element C3, and $K4(1, 1)$, $K4(1, 2)$, $K4(2, 1)$, and $K4(2, 2)$ correspond to the beam element C4. However, the portion which is indicated by M124, and in which $K1(2, 2)$, $K2(1, 1)$, and $K4(1, 1)$ overlap with each other, and that which is indicated by M23, and in which $K2(2, 2)$ and $K3(1, 1)$ overlap with each other are formed as portions where the constituent components are added together.

In this way, it is possible to produce a finite element model of a wire harness having clamps that are attached to branch wires branching off from a trunk wire, and to the trunk wire. Also the case of four or more beam elements can be handled in a similar manner. In this way, it is possible to produce a finite element model of a wire harness which is divided into an arbitrary number of beam elements.

When the displacement vector $\{x\}$ which is an unknown is obtained on the basis of Expressions (4) and (6) above, it is possible to calculate the desired reference shape.

Such a usual matrix finite element method is described also in, for example, Non-patent Reference 1.

Next, an example of a method of obtaining the property values required for the beam elements in the invention will be described. FIG. 8(A) is a view showing a manner of measuring a geometrical moment of inertia and a longitudinal modulus of elasticity, and FIG. 8(B) is a view showing a manner of measuring a polar geometrical moment of inertia and a transverse modulus of elasticity.

First, the length l, the sectional area A, and the density ρ can be obtained by conducting a simple calculating process after an objective wire harness is produced and measured with using vernier calipers, a tape measure, a weight meter, and the like.

In the case where the measuring method shown in FIG. 8(A) is conducted, the longitudinal modulus of elasticity E can be indicated by following Expression (7):

$$E = FL^3/3XI \qquad (7)$$

As described above, it is assumed that the wire harness has a circular section. Therefore, the geometrical moment of inertia I can be indicated by following Expression (8):

$$I = \pi D^4/64 \qquad (8)$$

As a result, the following expression is established:

$$E = 64FL^3/3X\pi D^4 \qquad (9)$$

In the measurement, the relationship between F and x is measured while setting the following expression:

$$E = (F/X) \times (64L^3/3\pi D^4).$$

As a result, the longitudinal modulus of elasticity E can be obtained.

By contrast, in the case where the measuring method shown in FIG. 8(B) is conducted, the transverse modulus of elasticity G can be indicated by following Expression (10):

$$G = (TL/\theta J) \times 2 \qquad (10)$$

Since it is assumed that the wire harness has a circular section, the polar geometrical moment of inertia J can be indicated by following Expression (11):

$$J = \pi D^4/32 \qquad (11)$$

The twisting force is indicated by:

$$T = FS \qquad (12)$$

Therefore, $$G = (32FSL/\theta \pi D^4) \times 2 = (F/\theta)(32SL/\pi D^4) \times 2 \qquad (13)$$

Consequently, the transverse modulus of elasticity G can be obtained by measuring the relationship between F and θ.

The above-described measuring methods are mere examples, and the values may be obtained by methods other than those of the above measurement examples. Alternatively, typical wire harnesses may be previously measured to form a database, and the database may be adequately used.

Figure 9:
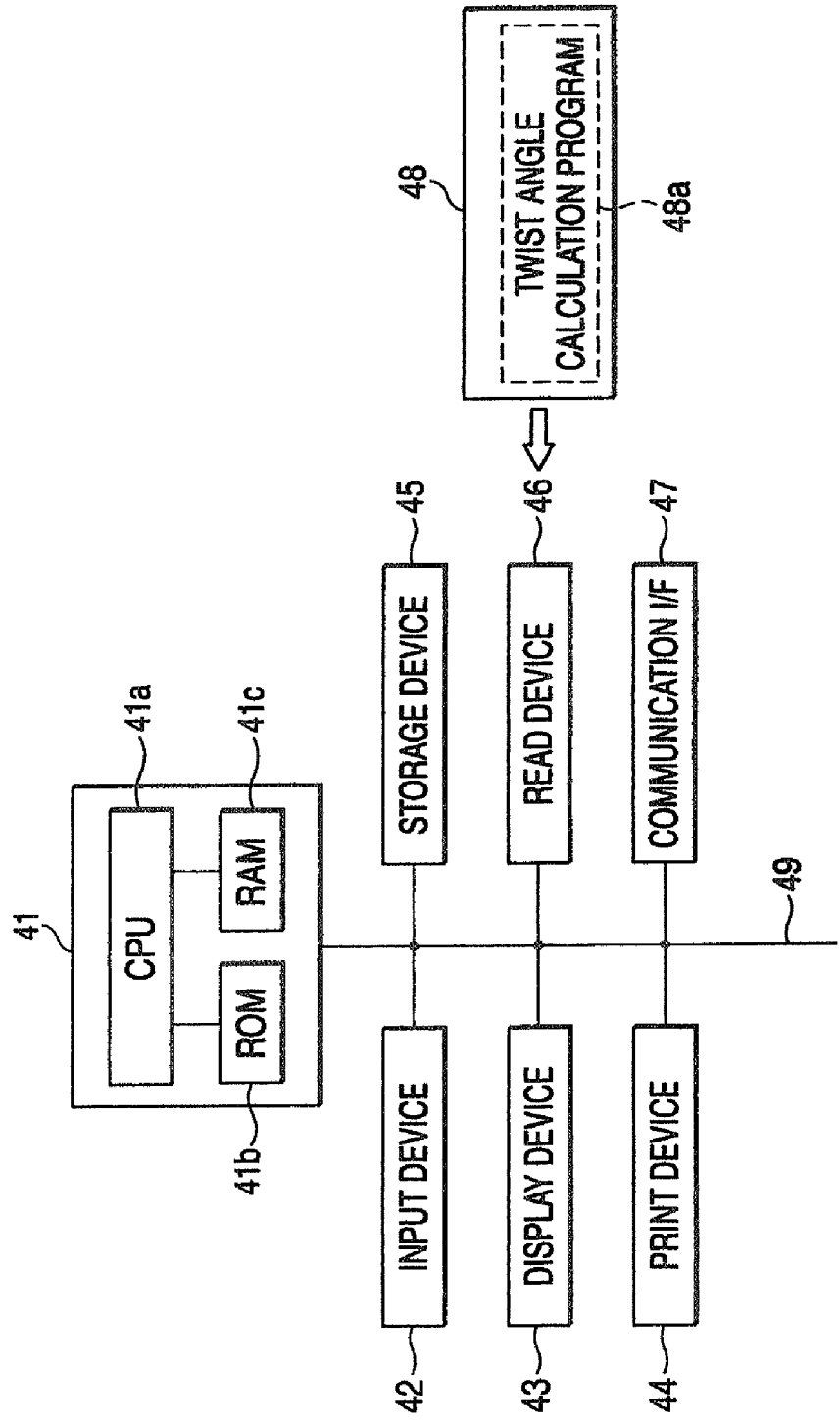
FIG. 9 is a block diagram showing an example of a hardware configuration according to the invention.

Next, a hardware configuration according to the invention for calculating the twist angle which will be described later, with using the above-described theory and fundamental expressions will be described. FIG. 9 is a block diagram showing the hardware configuration according to the invention.

In the invention, as shown in FIG. 9, a well-known personal computer which basically includes a microcomputer 41, an input device 42, a display device 43, a print device 44, a storage device 45, a read device 46, and a communication interface 47 may be used. The microcomputer 41 includes: a CPU 41a (Central Processing Unit); a ROM 41b which stores a boot program and the like; and a RAM 41c which temporarily stores various process results. The input device 42 is a keyboard through which the values are input, a mouse, or the like, the display device 43 is a CRT on which the process results are displayed, or the like, and the print device 44 is a printer which prints out the process results. The storage device 45 is a hard disk drive which stores application programs and the process results. The read device 46 is a device for reading a twist angle calculation program 48a which is stored in a storage medium 48 such as a CD or a DVD, and which indicates a process procedure shown in FIGS. 10, 11(A)-11(C), 14, 16, and 20. The communication interface 47 is a modem board or the like which conducts data communication with an external device with using, for example, a LAN line. These constituent components are connected to one another through an internal bus 49.

The microcomputer 41 transfers or installs the twist angle calculation program 48a which is read by the read device 46, into the storage device 45. After the power supply is turned on, the microcomputer 41 is activated by the boot program stored in the ROM 41b to start the installed twist angle calculation program 48a. In accordance with the twist angle calculation program 48a, thereafter, the microcomputer 41 obtains the twist angle in the wire harness, outputs the angle through the display device 43 and the print device 44, and stores the result into the storage device 45. The twist angle calculation program 48a can be installed also in another personal computer or the like having the above-described configuration. After the installation, the computer is caused to operate as an apparatus for calculating a twist angle.

The twist angle calculation program 48a which is stored in the storage medium 48, and a processing apparatus such as a personal computer in which the twist angle calculation program 48a is installed. The twist angle calculation program 48a may be provided not only by the storage medium 48 but also through a communication line such as the Internet or a LAN.

Furthermore, process procedures in embodiments of the invention will be described with reference to FIGS. 10, 11(A), 11(B), 11(C), 12(A), 12(B), 12(C), 12(D), 12(E), 13, 14, 15(A), 15(B), 15(C), 15(D), 16, 17, 18, 19, 20, 21, 22(A), 22(B), 22(C). Particularly, FIGS. 10, 11(A), 11(B), 11(C), 12(A), 12(B), 12(C), 12(D), 12(E) and 13 show a first embodiment of the invention, FIGS. 14 and 15(A)-15(D) are views showing a second embodiment of the invention. FIGS. 16 to 19 show a third embodiment of the invention, and FIGS. 20, 21, 22(A), 22(B) and 22(C) are views showing a fourth embodiment of the invention.

FIRST EMBODIMENT

Figure 10:
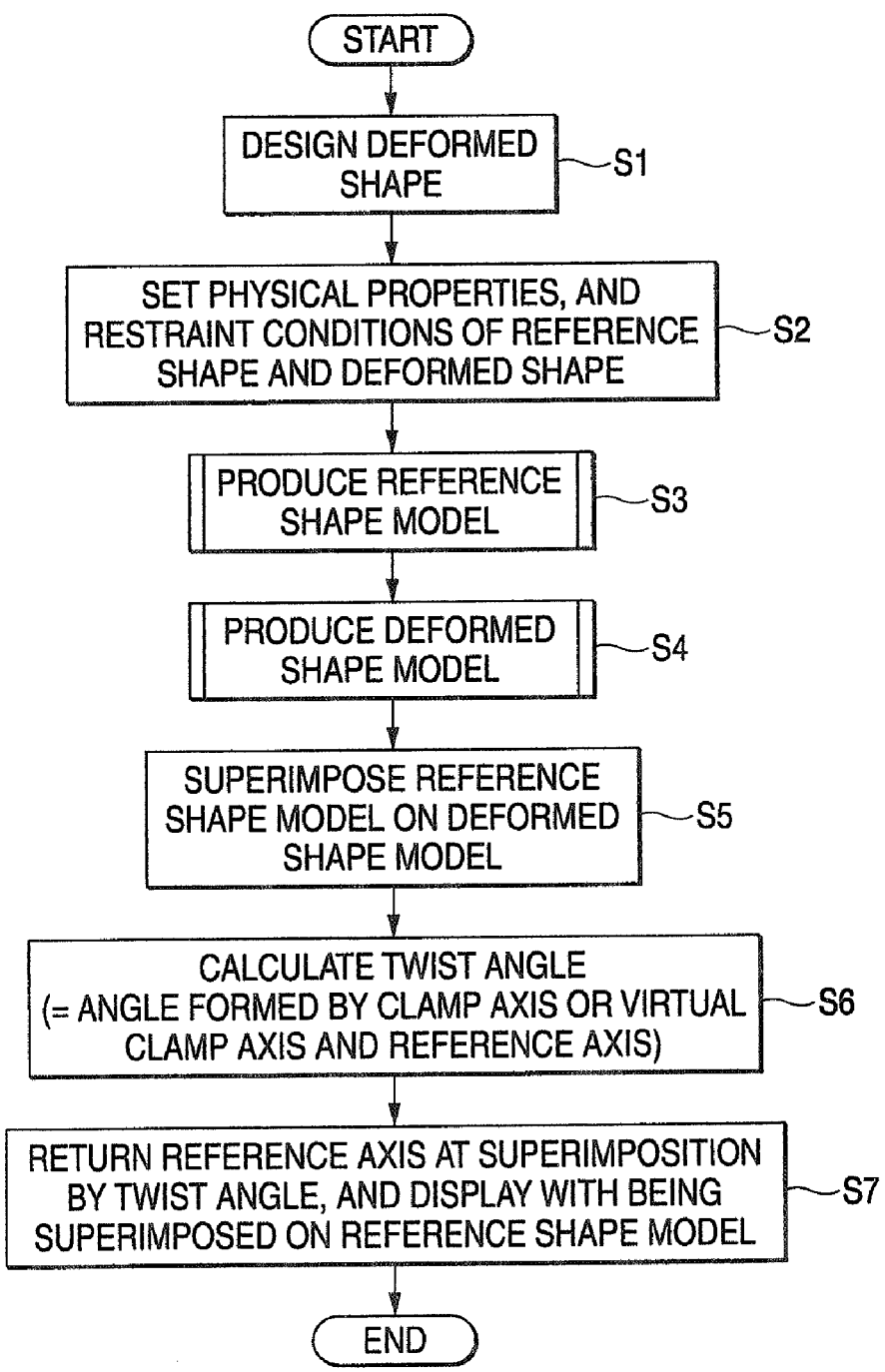
FIG. 10 is a flowchart showing a process procedure in a first embodiment of the invention.
Figure 11:
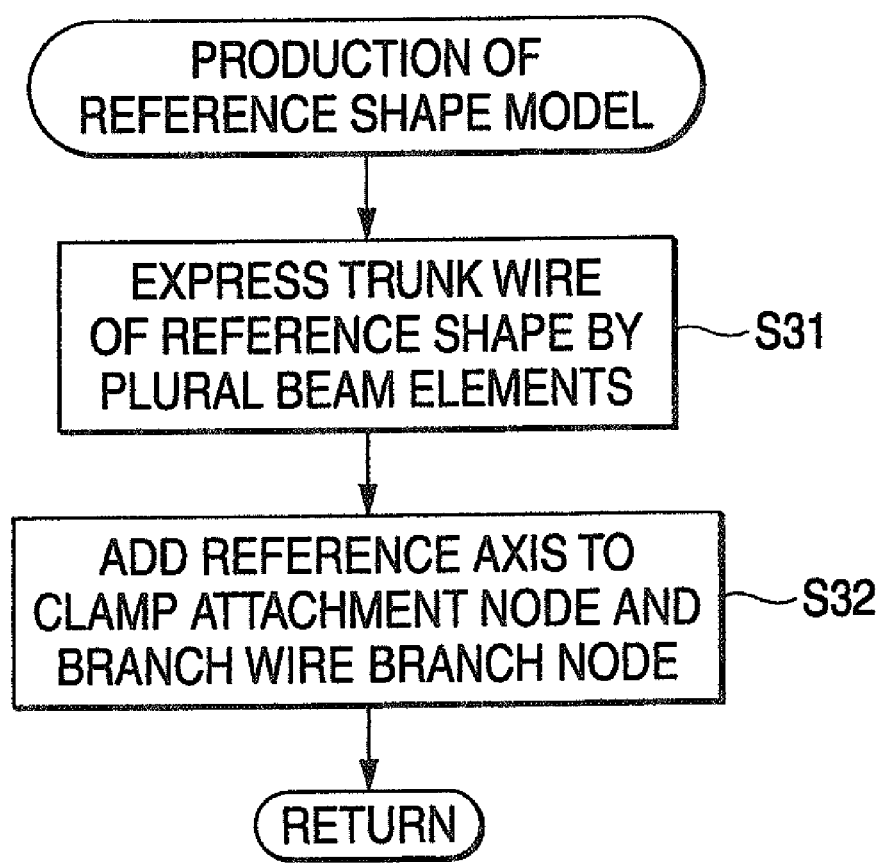
FIGS. 11(A) to 11(C) are flowcharts respectively showing subroutines in the process procedure of FIG. 10.
Figure 11:
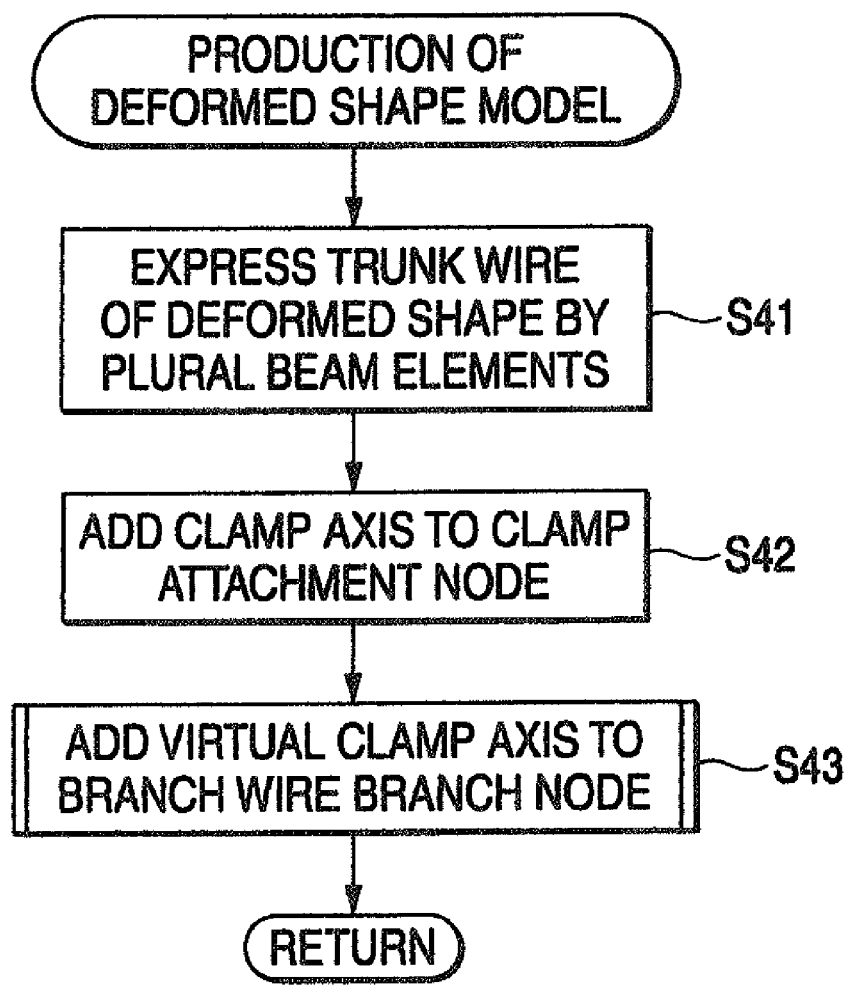
Figure 11:
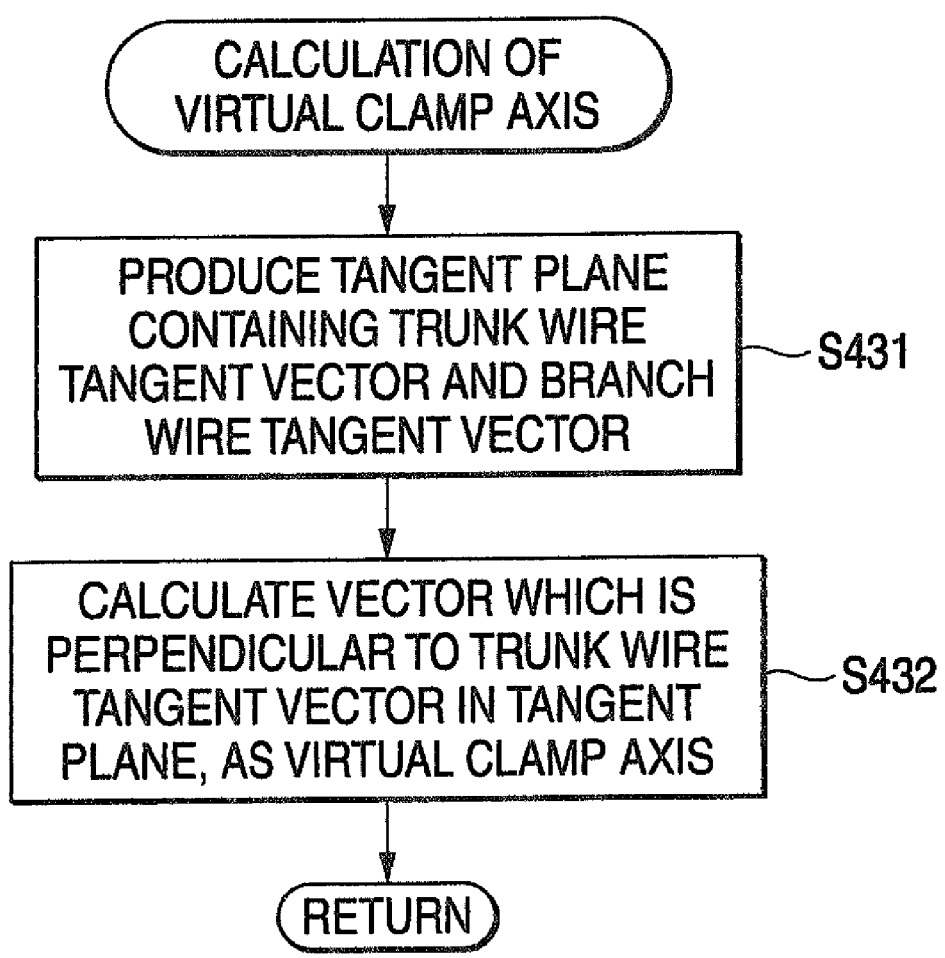
Figure 12:
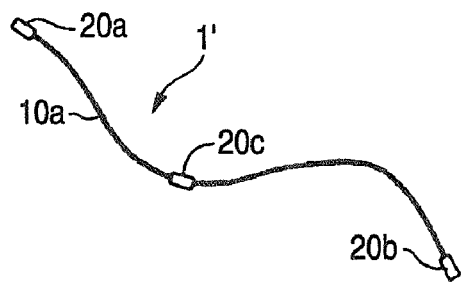
FIGS. 12(A) to 12(E) are views exemplarily showing states in the process of FIG. 10.
Figure 12:
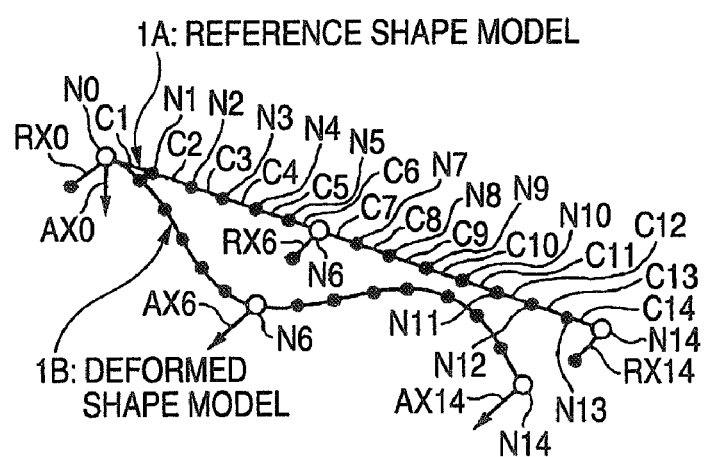
Figure 12:
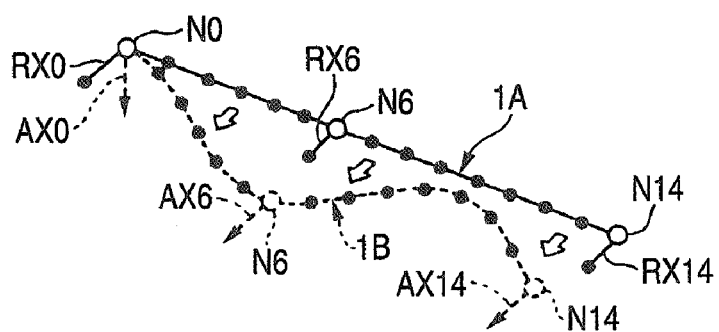
Figure 12:
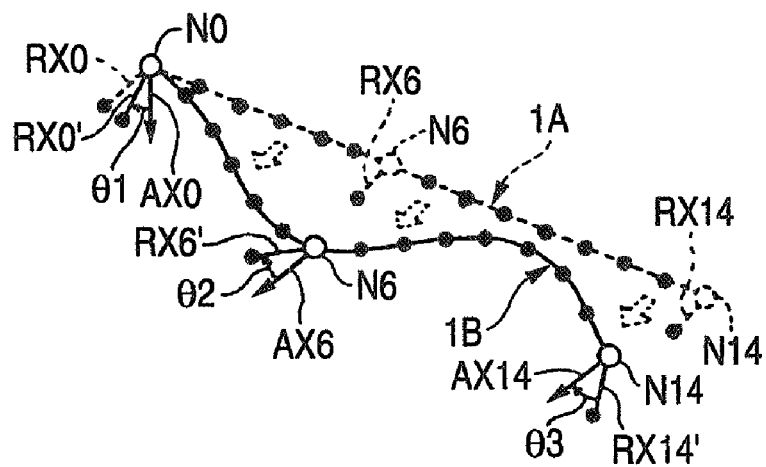
Figure 12:
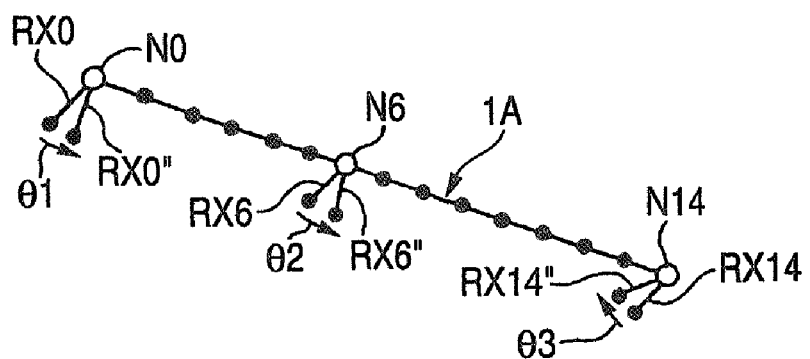
Figure 13:
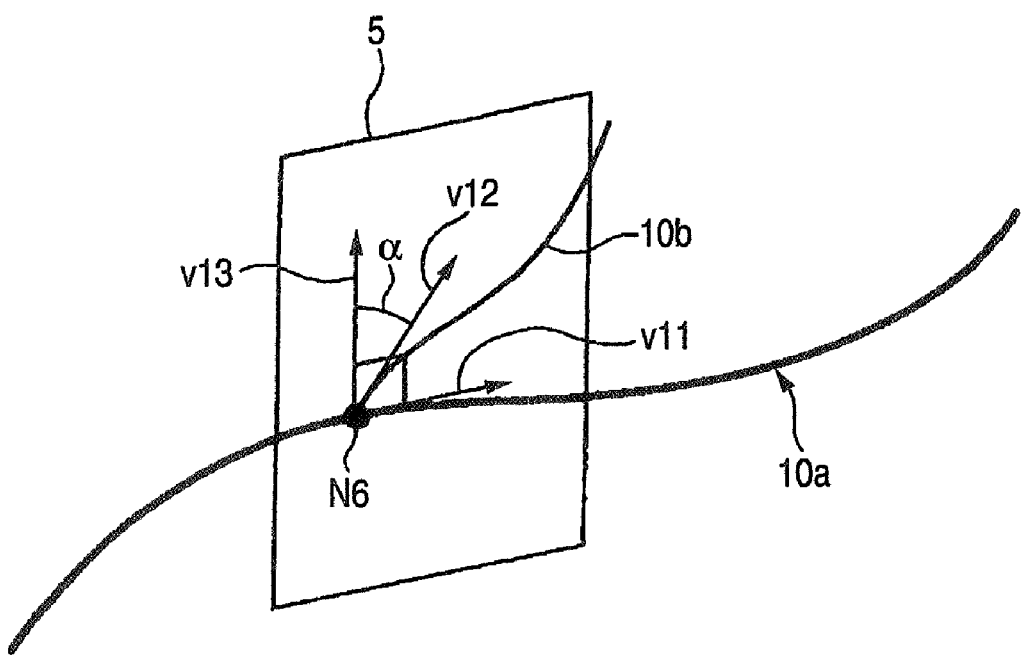
FIG. 13 is a view illustrating the process of FIG. 11(C).

FIG. 10 is a flowchart showing a process procedure in the first embodiment of the invention, and FIGS. 11(A) to 11(C) are flowcharts respectively showing subroutines in the process procedure of FIG. 10. FIGS. 12(A) to 12(E) are views exemplarily showing states in the process of FIG. 10, and FIG. 13 is a view illustrating the process of FIG. 11(C). The objective wire harness may be a wire harness which has no branch, and to which a clamp(s) is attached, one which has a branch(es), and to which no clamp is attached, or one which has a branch(es), and to which a clamp(s) is attached. FIGS. 12(A)-12(E) show, as a typical example, a wire harness which has no branch, and to which clamps are attached.

First, in step S1 of FIG. 10, a deformed shape is designed, and the designed deformed shape is output to the display device 43. The deformed shape is a wire harness 1' the shape of which is designed as shown in FIG. 12(A) so that the wire harness is laid in a predetermined portion such as a door of a vehicle or a floor. For example, the wire harness 1' includes a trunk wire 10a, and clamps 20a, 20b, 20c which are attached to an intermediate portion and end portions of the trunk wire 10a, and which are used for fixing the trunk wire 10a to a predetermined portion. Although not illustrated, a branch wire(s) which branches off from the trunk wire 10a may be included. In the design of the deformed shape, an application program such as a CAD which is previously installed can be used, and the deformed shape is drawn on the display device 43 with using a mouse or a keyboard serving as the input device 42. As a technique for obtaining the deformed shape, another method may be employed.

Next, in step S2, physical properties of the wire harness 1' are set with using the input device 42. Furthermore, also restraint conditions respectively corresponding to the above-mentioned deformed shape and the reference shape which will be described later are set in this step. For example, the physical properties are the length I, the sectional area A, the geometrical moment of inertia I, the geometrical moment of inertia J, the density $\rho$, the Poisson's ratio $\mu$, the longitudinal modulus of elasticity E, and the transverse modulus of elasticity G. As these properties, values which are previously measured or calculated as described above are used. These values relate to the elements in the stiffness matrix [K] of Expression (6). The restraint conditions are coordinates corresponding to the deformed shape and reference shape of the wire harness 1', and restrained degrees of freedom of the clamps 20a, 20b, 20c which are shown in FIG. 3.

Next, in each of step S3 and step S4, a reference shape model 1A and a deformed shape model 1B are produced as shown in FIG. 12(B) on the basis of the values which are set in step S2. In these steps, however, it is not required to display the models 1A and 1B on the display device 43. The reference shape model 1A and the deformed shape model 1B follow FIGS. 7(A) and 7(B) and Expression (6). When the reference shape model 1A is set so as to correspond to a shape which is obtained when the wire harness is developed on a jig plate, for example, the resulting model is effective in design of a jig plate which matches the actual state, efficient production of a wire harness, and the like. Step S3 corresponds to the reference shape model producing step and the reference shape model producing unit in the claims, and step S4 corresponds to the deformed shape model producing step and the deformed shape model producing unit in the claims.

In the production of the reference shape model 1A in step S3, as shown in the subroutine of FIG. 11(A), the trunk wire 10a of the wire harness 1' is expressed in step S31 by a plurality of beam elements C1 to C13. The reference numerals N0 to N14 designate nodes. In step S32, reference axes RX0, RX6, RX14 are added to clamp attachment nodes N0, N6, N14 corresponding to the portions to which the clamps 20a, 20b, 20c are attached, respectively.

For example, the reference shape model 1A corresponds to a shape in the case where the trunk wire 10a is linearly stretched on a jig plate without being twisted. All the reference axes RX0, RX6, RX14 elongate in the same direction from the nodes N0, N6, N14. In the case where there is a branch wire which branches off from the trunk wire 10a, a similar reference axis is added to a node corresponding to a branch wire branch point. In the above, the configuration in which the reference axes are added after the trunk wire is expressed by the beam elements has been described. However, the method of producing the reference shape model 1A is not restricted to this. In summary, it is necessary only that the reference shape model 1A such as that shown in FIG. 12(B) is finally produced.

In the production of the deformed shape model 1B in step S4, as shown in the subroutine of FIG. 11(B), the trunk wire 10a of the wire harness 1' is expressed in step S41 by a plurality of beam elements C1 to C13 in the same manner as step S31. In the deformed shape model 1B, however, the beam elements C1 to C13 are coupled together in the respective nodes so as to correspond to the deformed shape which is designed in step S1.

Next, in step S42, clamp axes AX0, AX6, AX14 are added to the clamp attachment nodes N0, N6, N14, respectively. The clamp axes AX0, AX6, AX14 correspond to the rotation axes of the clamps 20a, 20b, 20c which are attached to the trunk wire. In the case where there is a branch wire which branches off from the trunk wire 10a, moreover, a virtual clamp axis corresponding to the clamp axis is added to a node corresponding to the branch wire branch point in step S43.

The virtual clamp axis will be described with reference to FIGS. 11(C) and 13. First, in step S431, a tangent plane 5 is produced which contains both a tangent vector v11 (referred to as trunk wire tangent vector) starting at the branch wire branch node N6 and with respect to the trunk wire 10a, and a tangent vector v12 (referred to as branch wire tangent vector) similarly starting at the branch wire branch node N6 and with respect to a branch wire 10b.

In step S432, a vector which starts at the branch wire branch node N6 in the tangent plane 5, and which is perpendicular to the trunk wire tangent vector v11 is calculated as a virtual clamp axis v13. Steps S431 and S432 correspond to the tangent plane producing step and the virtual clamp axis calculating step in the claims, respectively. When the virtual clamp axis v13 is calculated, also a twist angle of a branch wire can be obtained in the same process procedure as that of a clamp. Therefore, the efficiency of the procedure of the process of calculating a twist angle is enhanced.

Also in the above, the configuration in which the clamp axis and the virtual clamp axis are added after the trunk wire is expressed by the beam elements has been described. However, the method of producing the deformed shape model 1B is not restricted to this. In summary, it is necessary only that the deformed shape model 1B such as that shown in FIG. 12(B) is finally produced.

Returning to FIG. 10, in step S5, the reference shape model 1A is superimposed on the deformed shape model 1B as shown in FIGS. 12(C) and 12(D). A finite element method is used in the superimposing process. Namely, assuming that the reference shape model 1A is compulsively displaced to the deformed shape model 1B as indicated by the arrows of broken lines in the figure while satisfying the physical properties set in step S2, a solution in a finite element method is obtained. This will be supplementarily described. The process is conducted while, among all the nodes, a specific node in which a clamp is disposed, or from which a branch wire branches off, such as N0 is set to be completely restrained, and the other nodes are set to be freely rotatable all round. Step S5 corresponds to the superimposition calculating step and the superimposition calculating unit in the claims.

Next, in step S6, a twist angle is calculated on the basis of a result of the superimposition. Namely, as shown in FIG. 12(D), in accordance that the reference shape model 1A is superimposed on the deformed shape model 1B, also the reference axes RX0, RX6, RX14 are rotated. At the timing when the superimposition is ended, the rotated reference axes RX0, RX6, RX14, and the clamp axes AX0, AX6, AX14 form predetermined angles $\theta1$, $\theta2$, $\theta3$, respectively. These angles are calculated as a twist angle. In the case where there is a branch wire, the angle which is calculated as described above, and which is formed by a virtual clamp axis and a reference axis is calculated as a twist angle of the branch wire. Step S6 corresponds to the twist angle calculating step and the twist angle calculating unit in the claims.

Then, in step S7, the clamp axes AX0, AX6, AX14 are returned by degrees corresponding to the calculated twist angles $\theta1$, $\theta$, $\theta3$ as shown in FIG. 12(E), and then displayed together with the reference shape model 1A on the display device 43. The twist angles are displayed in the form of numerals, characters, or the like, together with the reference shape which is graphically displayed. In addition to the display on the display device 43, printing may be conducted on a paper sheet by the print device 44. Step S7 corresponding to the displaying step in the claims. As a result of such display, the twist angles can be grasped visually and intuitively. Therefore, this is effective in more accurate design of a jig plate and further efficient production of a wire harness. Furthermore, the reference shape is not always requested to be displayed, and it is required only to display at least the twist angles.

As described above, according to the first embodiment of the invention, the superimposing process is conducted with using a finite element method, whereby a twist angle of a branch wire and/or a clamp which is hardly obtained in the conventional art can be calculated easily and correctly. Therefore, the embodiment is effective in accurate design of a jig plate, efficient production of a wire harness, and the like.

SECOND EMBODIMENT

Figure 14:
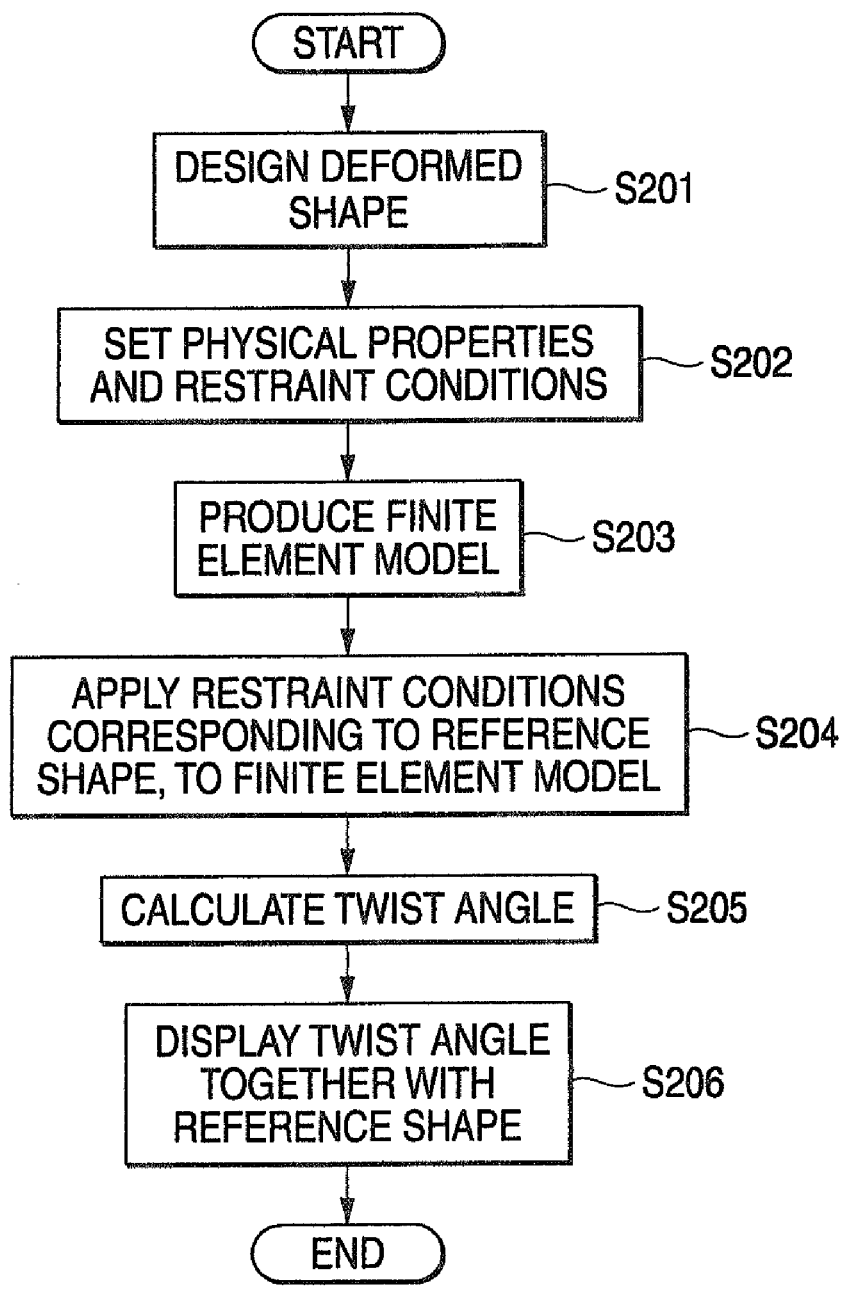
FIG. 14 is a flowchart showing a process procedure in a second embodiment of the invention.

FIG. 14 is a flowchart showing a process procedure in a second embodiment of the invention. FIGS. 15(A) to 15(D) are views exemplarily showing states in the process of FIG. 14, respectively.

Figure 15:
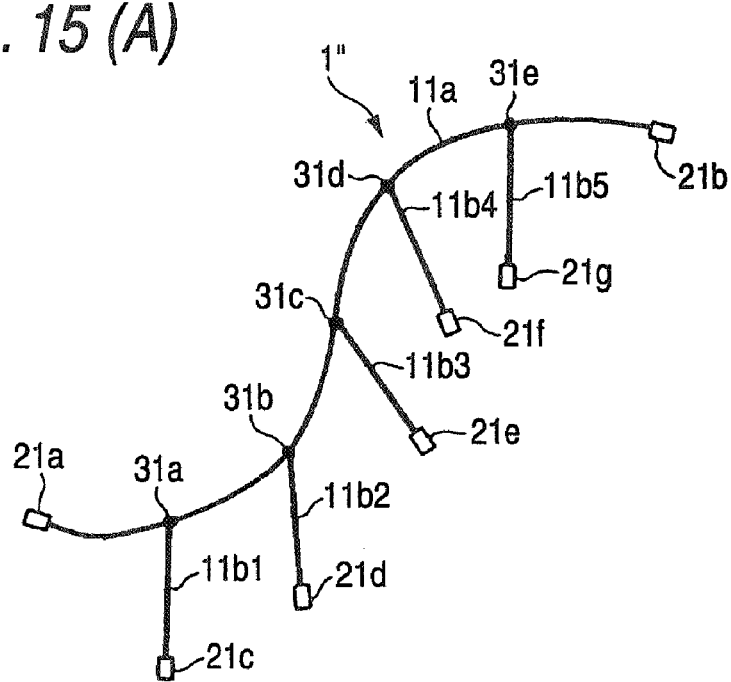
FIGS. 15(A) to 15(D) are views exemplarily showing states in the process of FIG. 14, respectively.
Figure 15:
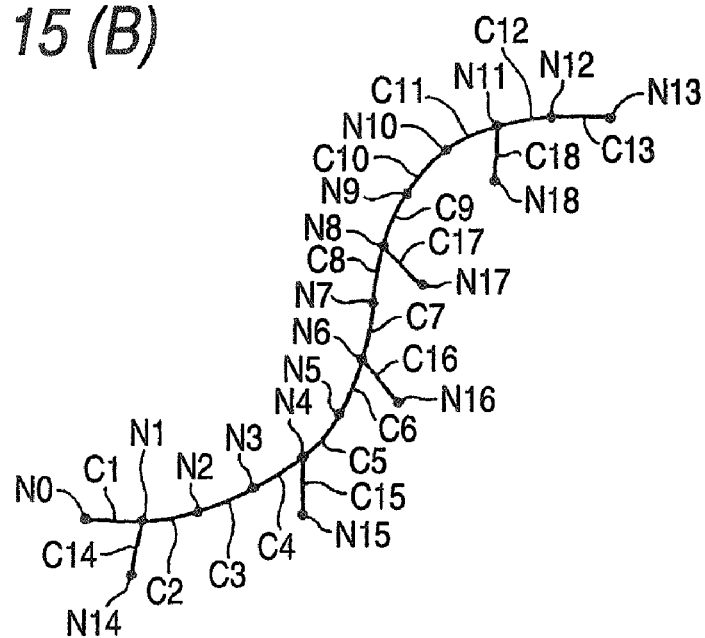
Figure 15:
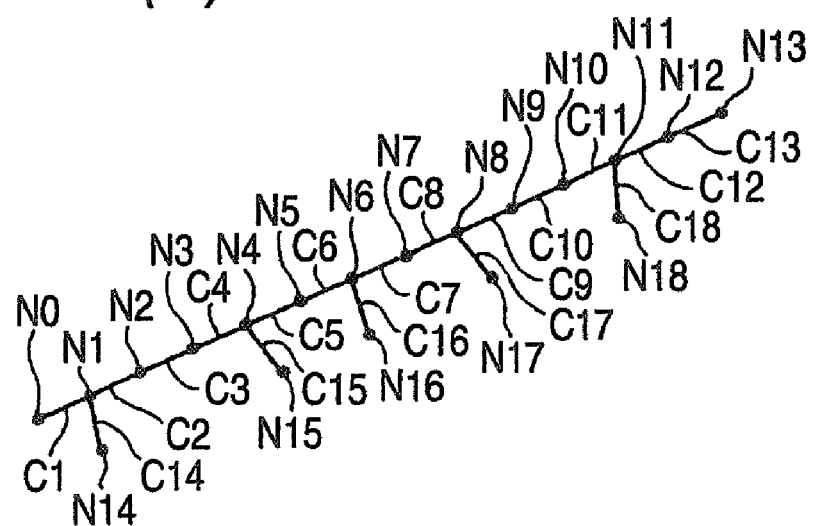
Figure 15:
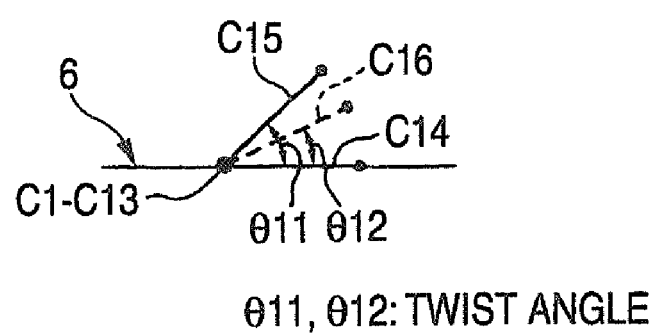

First, in step S201 of FIG. 14, a deformed shape such as shown in FIG. 15(A) is designed in the same manner as step S1 of FIG. 10, and the designed deformed shape is output to the display device 43. In the embodiment, a wire harness 1" is assumed which includes a trunk wire 11a and branch wires 11b1 to 11b5 that branch off from the trunk wire 11a at nodes 31a to 31e, respectively. It is a matter of course that, in the same manner as the first embodiment, a clamp may be attached to an intermediate portion of the trunk wire 11a. For example, the wire harness 1" includes the trunk wire 11a, and a plurality of branch wires 11b1 to 11b5 which branch off from the trunk wire 11a in different directions. Clamps 21a to 21g are attached to end portions of the trunk wire 11a and the branch wires 11b to 11b5.

Next, in step S202, physical properties of the wire harness 1" are set with using the input device 42. Furthermore, also restraint conditions respectively corresponding to the above-mentioned deformed shape and the reference shape which will be described later are set in this step. For example, the physical properties are the length I, the sectional area A, the geometrical moment of inertia I, the geometrical moment of inertia J, the density $\rho$, the Poisson's ratio $\mu$, the longitudinal modulus of elasticity E, and the transverse modulus of elasticity G. As these properties, values which are previously measured or calculated as described above are used. These values relate to the elements in the stiffness matrix [K] of Expression (6). The restraint conditions are coordinates corresponding to the deformed shape of the wire harness 1", and restrained degrees of freedom of the clamps 21a to 21g which are shown in FIG. 3.

Next, in step S203, a finite element model such as shown in FIG. 15(B) corresponding to the deformed shape is produced on the basis of the values which are set in step S202. The finite element model is an expansion of a wire harness model which has a trunk wire and a branch wire branching off from the trunk wire as indicated by Expression (6) above. For example, the wire harness 1 is divided into beam elements C1 to C16 having the same length, and the finite element model is produced on the basis of the beam elements C1 to C18. Since the final purpose is to obtain a twist angle, in order to simplify the calculation, the beam elements C14 to C18 respectively corresponding to the branch wires 11$b$1 to 11$b$5 are set to have the same length as the beam elements C1 to C13 which are obtained by dividing the trunk wire. The reference numerals N0 to N18 designate nodes. Step S203 corresponds to the finite element model producing step in the claims.

Next, in step S204, the physical properties, and restraint conditions corresponding to the reference shape are applied to the finite element model, whereby the deformed shape such as shown in FIG. 15(B) is deformed to the reference shape such as shown in FIG. 15(C). For example, the reference shape exists in a plane containing the trunk wire 11$a$ which is linearly stretched without being twisted. When the restraint conditions corresponding to the reference shape are set so as to attain a state where the trunk wire is free from a twist, a twist angle calculation which will be described later is facilitated. Step S204 corresponds to the deforming step in the claims.

As the plane, preferably, a reference plane 6 in which a jig plate that is to be used in production of the wire harness is assumed is set as shown in FIG. 15(D), and the restraint conditions (coordinates) are set so that the trunk wire exists in the reference plane 6. This is effective in design of a jig plate which matches the actual state, production of a wire harness, and the like.

Preferably, the restraint conditions (coordinates) are set so that, among the all wire members constituting the wire harness, the trunk wire has the largest diameter, and the trunk wire (corresponding to C1 to C13) and the branch wire (corresponding to C14) having a diameter next to that of the trunk wire exist in the reference plane 6. This is effective in design of a jig plate which further matches the actual state, production of a wire harness, and the like. In this case, the restraint conditions (complete restraint) are set so that the node N14 corresponding to the branch wire which is next in thickness to the trunk wire exists in the reference plane 6, but the nodes N15 to N18 corresponding to the other branch wires are set so as not to be restrained (for example, freely rotatable all round).

Next, in step S205, twist angles of the branch wires are calculated. The twist angles can be calculated with using coordinate information corresponding to the reference shape. In this calculation, for example, twist angles $\theta$11, $\theta$12 of the beam elements C15, C16 indicating the branch wires with respect to the reference plane 6 in which the trunk wire 1" and the beam element C14 that is next in thickness to the trunk wire 1" exist are preferably obtained as described above (see FIG. 15(D)). Step S205 corresponds to the twist angle calculating step in the claims.

Then, in step S206, the twist angles $\theta$11, $\theta$12 which are calculated in step S205 are displayed together with the reference shape on the display device 43. In an example of this display, the model shape configured by beam elements such as shown in FIG. 15(C) is converted to the actual shape such as shown in FIG. 15(A), and then graphically displayed on the display device 43. The twist angles are displayed in the form of numerals, characters, or the like, together with the reference shape which is graphically displayed. In addition to the display on the display device 43, printing may be conducted on a paper sheet by the print device 44. Furthermore, the reference shape is not always requested to be displayed, and it is required only to display at least the twist angles.

Although a clamp that may produce a twist in the trunk wire of the wire harness which is exemplarily shown in FIGS. 15(A)-15(D) is not attached to the trunk wire, twist angles in a wire harness to which also a clamp that may produce a twist in such a trunk wire together with branch wires is attached can be similarly calculated. In this case, for example, an angle such as shown in the first embodiment which is formed by a clamp axis and the reference plane 6 is obtained as a twist angle. This is effective in design of a jig plate which further matches the actual state, production of a wire harness, and the like. Similarly, also twist angles in a wire harness in which only the clamps are attached to a trunk wire can be calculated. This is effective in design of a jig plate for a wire harness in which a large number of clamps are used, production of such a wire harness, and the like.

As described above, according to the second embodiment of the invention, the finite element model is produced, the design shape is deformed to a shape which allows the trunk wire exists in the reference plane, and an angle which is formed by a branch wire at this time with respect to the reference plane is obtained as a twist angle. Therefore, it is possible to clearly grasp a twist angle of a branch wire which is hardly correctly grasped in the conventional art. Consequently, the embodiment is effective in accurate design of a jig plate, efficient production of a wire harness, and the like.

Moreover, third and fourth embodiments of the invention will be described. The third and fourth embodiments are expansions of the concept of the first embodiment.

THIRD EMBODIMENT

Figure 16:
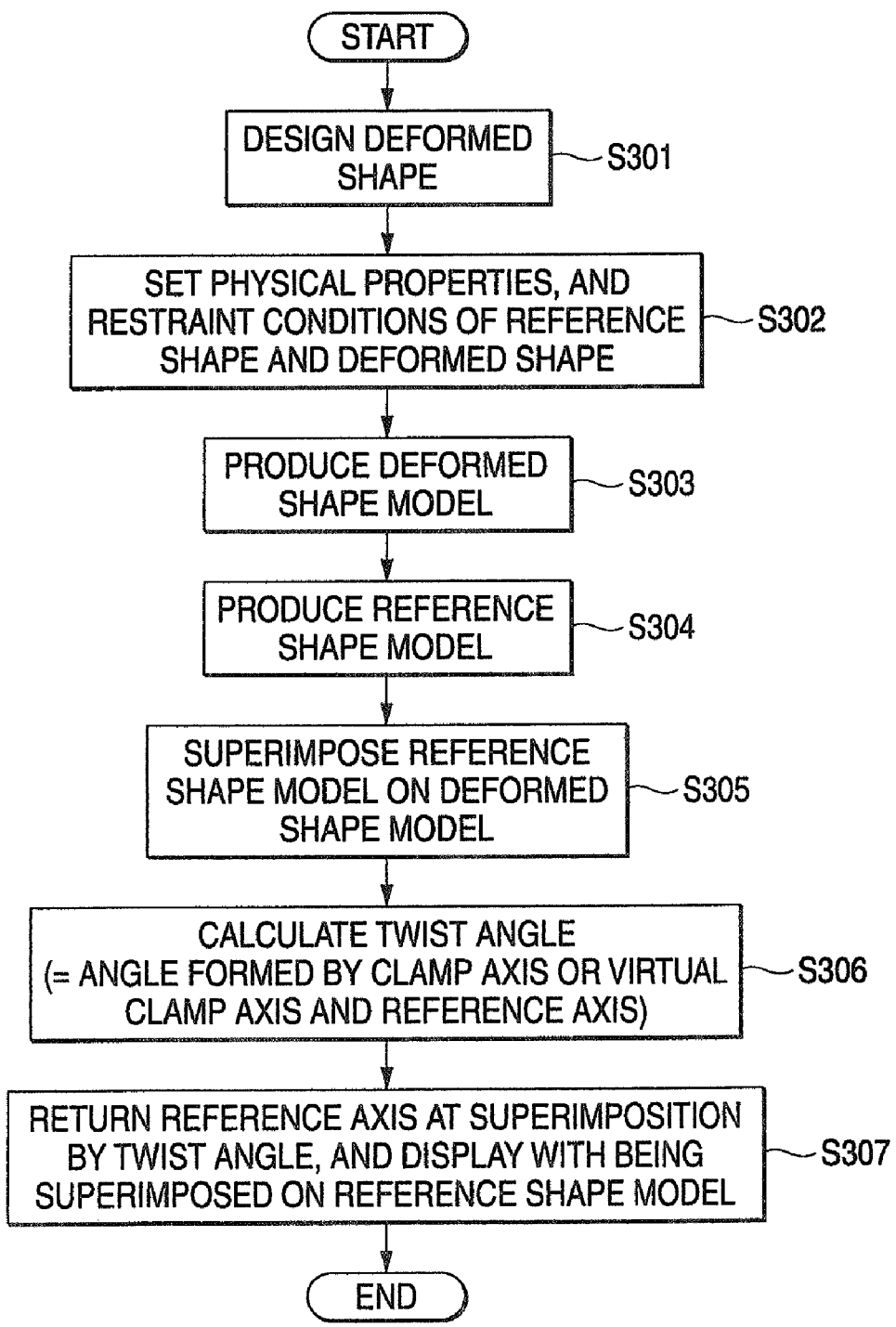
FIG. 16 is a flowchart showing a process procedure in a third embodiment of the invention.
Figure 17:
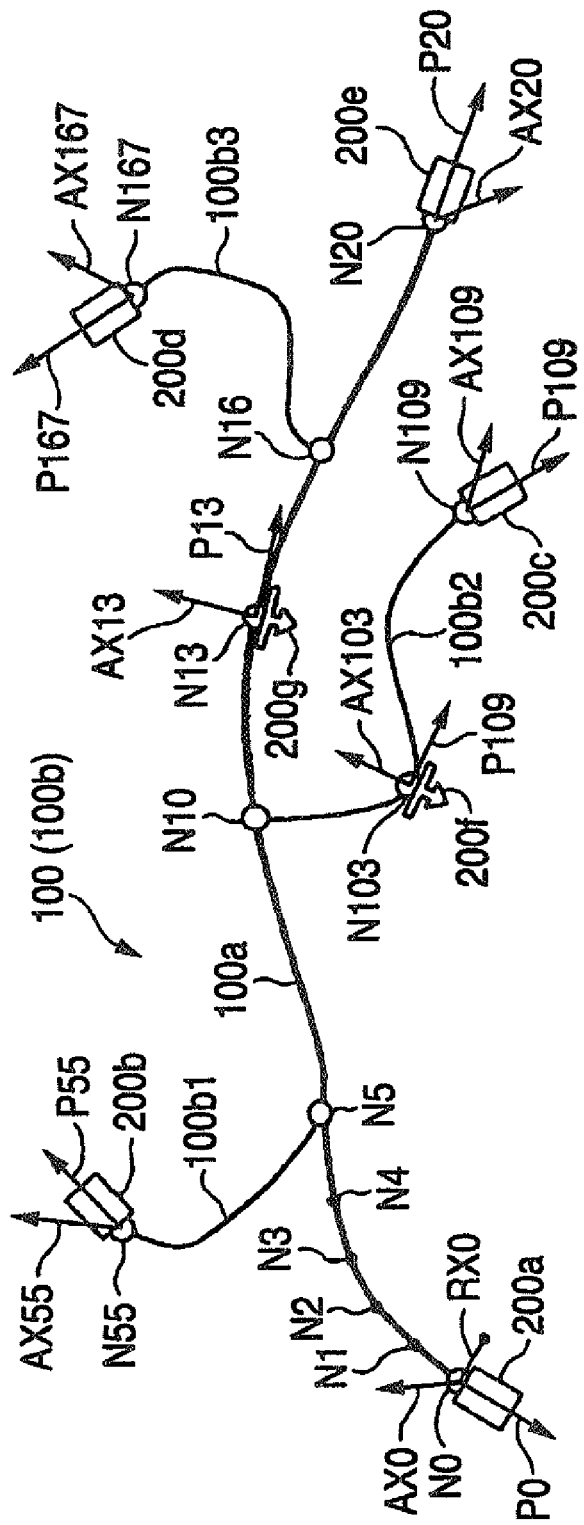
FIG. 17 is a view exemplarily showing a state in the process of FIG. 16.
Figure 18:
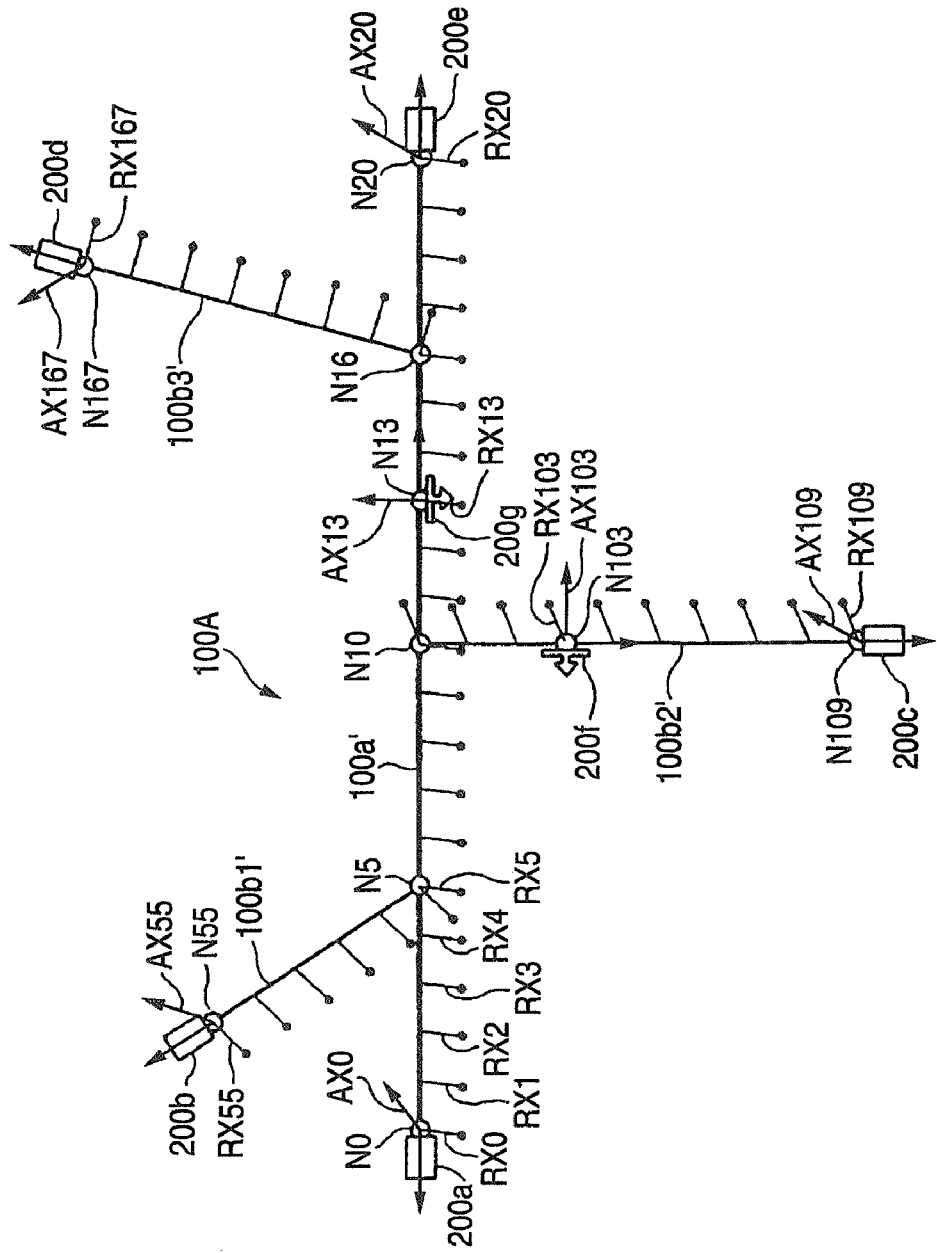
FIG. 18 is a view exemplarily showing a state in the process of FIG. 16.
Figure 19:
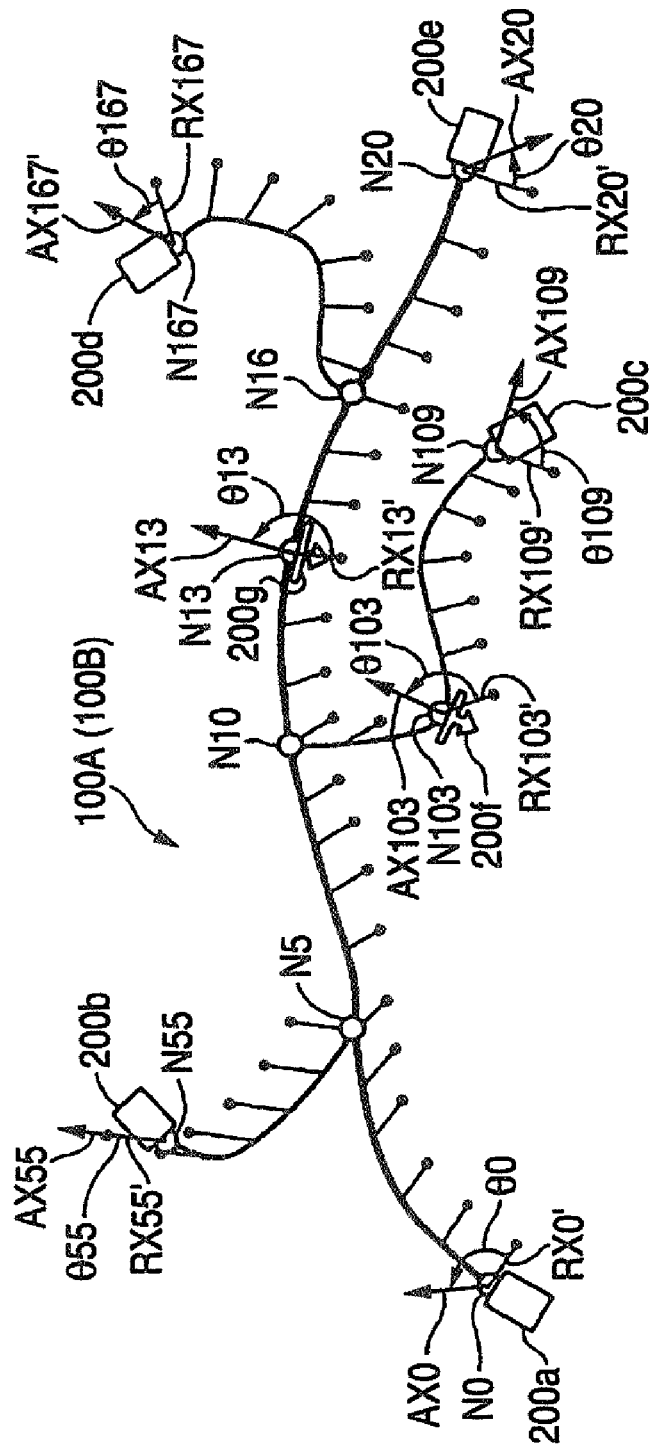
FIG. 19 is a view exemplarily showing a state in the process of FIG. 16.

FIG. 16 is a flowchart showing a process procedure in a third embodiment of the invention, and FIGS. 17 to 19 are views exemplarily showing states in the process of FIG. 16, respectively. The third embodiment is configured by expanding the concept of the first embodiment so as to, in a wire harness having a branch wire which branches off from a trunk wire, or that in which a clamp is further attached to a branch wire, obtain twist angles of the branch wire and the clamp.

First, in step S301 of FIG. 16, a deformed shape is designed, and the designed deformed shape is output to the display device 43. The deformed shape 100B is a wire harness 100 the shape of which is designed as shown in FIG. 17 so that the wire harness is laid in a predetermined portion such as a door of a vehicle or a floor. For example, the wire harness 100 includes: a trunk wire 100$a$; branch wires 100$b$1, 100$b$2, 100$b$3 which branch off from the trunk wire 100$a$; and clamps 200$a$ to 200$f$ which are attached to intermediate and end portions of the trunk wire 100$a$ and the branch wires 100$b$1, 100$b$2, 100$b$3, and which are used for fixing the portions to predetermined portions. In the design of the deformed shape, an application program such as a CAD which is previously installed can be used, and the deformed shape is drawn on the display device 43 with using a mouse or a keyboard serving as the input device 42. As a technique for obtaining the deformed shape, another method may be employed.

Next, in step S302, physical properties of the wire harness 100 are set with using the input device 42. Furthermore, also restraint conditions respectively corresponding to the deformed shape 100B and the reference shape which will be described later are set in this step. For example, the physical properties are the above-mentioned properties, or the length I, the sectional area A, the geometrical moment of inertia I, the geometrical moment of inertia J, the density $\rho$, the Poisson's ratio $\mu$, the longitudinal modulus of elasticity E, and the transverse modulus of elasticity G. As these properties, values which are previously measured or calculated as described above are used. These values relate to the elements in the stiffness matrix [K] of Expression (6) above. The restraint conditions are coordinates corresponding to the deformed shape and reference shape of the wire harness 100, and restrained degrees of freedom of the clamps 200a to 200f which are shown in FIG. 3.

Next, in each of step S303 and step S304, the deformed shape model 100B and a reference shape model 100A are produced as shown in FIGS. 17 and 18, respectively on the basis of the values which are set in step S302. In these steps, however, it is not required to display the models 100A and 100B on the display device 43. The reference shape model 100A and the deformed shape model 100B are similar to the reference shape model 1A and the deformed shape model 1B which are shown in the first embodiment.

More specifically, in the deformed shape model 100B, the deformed shape of the trunk wire 100a of the wire harness 100 is expressed in FIG. 17 as a coupled member of beam elements which are connected together at a plurality of nodes N0, N1, N2, N3, N4, N5, ..., N10, ..., N16, ..., N20. The branch wires 100b1, 100b2, 100b3 of the wire harness 100 are expressed as coupled members of beam elements which are connected together at a plurality of nodes N5, ..., N55, N10, ..., N109, and N16, ..., N167, respectively. Furthermore, for each of clamp attachment nodes N0, N13, N20, N55, N103, N109, and N167, clamp axes AX0, AX13, AX20, AX55, AX103, AX109, and AX167 which define the locking directions of the clamps (in the case of 200a to 200d) and the clamp rotation axes (in the case of 200f and 200g) are set. In the figure, P0, P13, P20, P55, P103, P109, and P167 designate clamp local axes in an insertion direction or the like. Moreover, the branch wire branch nodes N5, N10, and N16 are points for obtaining the twist angles of the branch wires, respectively. In FIG. 17, RX0 is an axis which functions as a reference for obtaining a twist angle. The twist angle of each node is expressed as a rotation angle with respect to RX0. Also in a superimposing process which will be described later, RX0 is set immovable.

The reference shape model 100A corresponds to shapes 100a', 100b1' to 100b3' in which the trunk wire 100a and the branch wires 100b1 to 100b3 are linearly stretched on the jig plate without being twisted. In the figure, also the clamp axes AX0, AX13, AX20, AX55, AX103, AX109, and AX167 correspond to this. In the reference shape model 100A, reference axes RX0, RX1, RX2, RX3, RX4, RX5, ..., RX10, ..., RX16, ..., RX20, and reference axes RX5, ..., RX55, RX10, ..., RX109, and RX16, ..., NX167 are set to all the nodes N0, N1, N2, N3, N4, N5, ..., N10, ..., N16, ..., N20, and the nodes N5, ..., N55, N10, ..., N109, and N16, ..., N167. All the reference axes elongate in the same direction from the respective nodes (so as to coincide with RX0 in FIG. 17). In the embodiment, the intervals between the nodes are uniform. However, the intervals between the nodes are not always necessary to be uniform, and it is requested that the nodes of the deformed shape model coincide with those of the reference shape model, respectively.

The methods of producing the reference shape model 100A and the deformed shape model 100B are basically identical with the methods described in the first embodiment, and can be considered as those in which the methods of the first embodiment are expanded to a wire harness having branch wires. Furthermore, a similar reference axis is added also to the nodes N5, N10, N16 corresponding to the branch wire branch points. A virtual clamp axis corresponding to the clamp axis, such as that described in the first embodiment is set for the reference axes. Step S303 corresponds to the main wire deformed shape model producing step and the sub wire deformed shape model producing step in the claims, and step S304 corresponds to the main wire reference shape model producing step and the sub wire reference shape model producing step in the claims.

Next, in step S305, the reference shape model 100A is superimposed on the deformed shape model 100B as shown in FIG. 19. A finite element method is used in the superimposing process. Namely, assuming that the reference shape model 100A is compulsively displaced to the deformed shape model 100B while satisfying the physical properties set in step S2, a solution in a finite element method is obtained. This will be supplementarily described. The process is conducted while, among all the nodes, a specific node in which a clamp is disposed, or from which a branch wire branches off, such as N0 is set to be completely restrained, and the other nodes are set to be freely rotatable all round. Also the superimposing method is basically identical with the method described in the first embodiment, and can be considered as that in which the method of the first embodiment is expanded to a wire harness having branch wires. In the case where the twist angle (corresponding to the second twist angle) of the clamp 200f attached to the branch wire 100b2 is to be obtained, however, the twist angle (corresponding to the first twist angle) of the branch wire 100b2 is referred.

Next, in step S306, a twist angle is calculated on the basis of a result of the superimposition. Namely, as shown in FIG. 19, in accordance that the reference shape model 100A is superimposed on the deformed shape model 100B, also the reference axes RX0, ... RX20 shown in FIG. 18 are rotated. At the timing when the superimposition is ended, the rotated reference axes RX0', RX13', RX20', RX55', RX103', RX109', and RX167', and the clamp axes AX0, AX13, AX20, AX55, AX103, AX109, and AX167 form predetermined angles θ0, θ13, θ20, θ55, θ103, θ109, and θ167, respectively. These angles are calculated as a twist angle. Although also reference axes which are not exemplarily shown in the above, and which are not illustrated are rotated and have respective twist angles, these reference axes are omitted. Steps S305 and S306 correspond to the twist angle calculating step in the claims.

Although not illustrated, in step S307, the clamp axes AX0, AX13, AX20, AX55, AX103, AX109, and AX167 are returned by degrees corresponding to the calculated twist angles θ0, θ13, θ20, θ55, θ103, θ109, and θ167 in the same manner as the method shown in FIG. 12(E), and then displayed together with the reference shape model 100A on the display device 43. The twist angles are displayed in the form of numerals, characters, or the like, together with the reference shape which is graphically displayed. In addition to the display on the display device 43, printing may be conducted on a paper sheet by the print device 44. When it is requested only to obtain twist angles, the process of step S307 is not always necessary, and hence may be omitted.

Although the above description is focused on the twist angles of the clamps, also twist angles in the branch nodes N5, N10, and N16 of the branch wires 100b1 to 100b3 can be similarly obtained on the basis of the virtual clamp axis and the reference axis.

As described above, according to the third embodiment of the invention, the superimposing process is conducted with using a finite element method, whereby twist angles of branch wires branching off from the trunk wire, and clamps attached to the branch wires can be calculated easily and correctly.

Consequently, the embodiment is effective in adequate design of a jig plate, efficient production of a wire harness, and the like.

FOURTH EMBODIMENT

Figure 20:
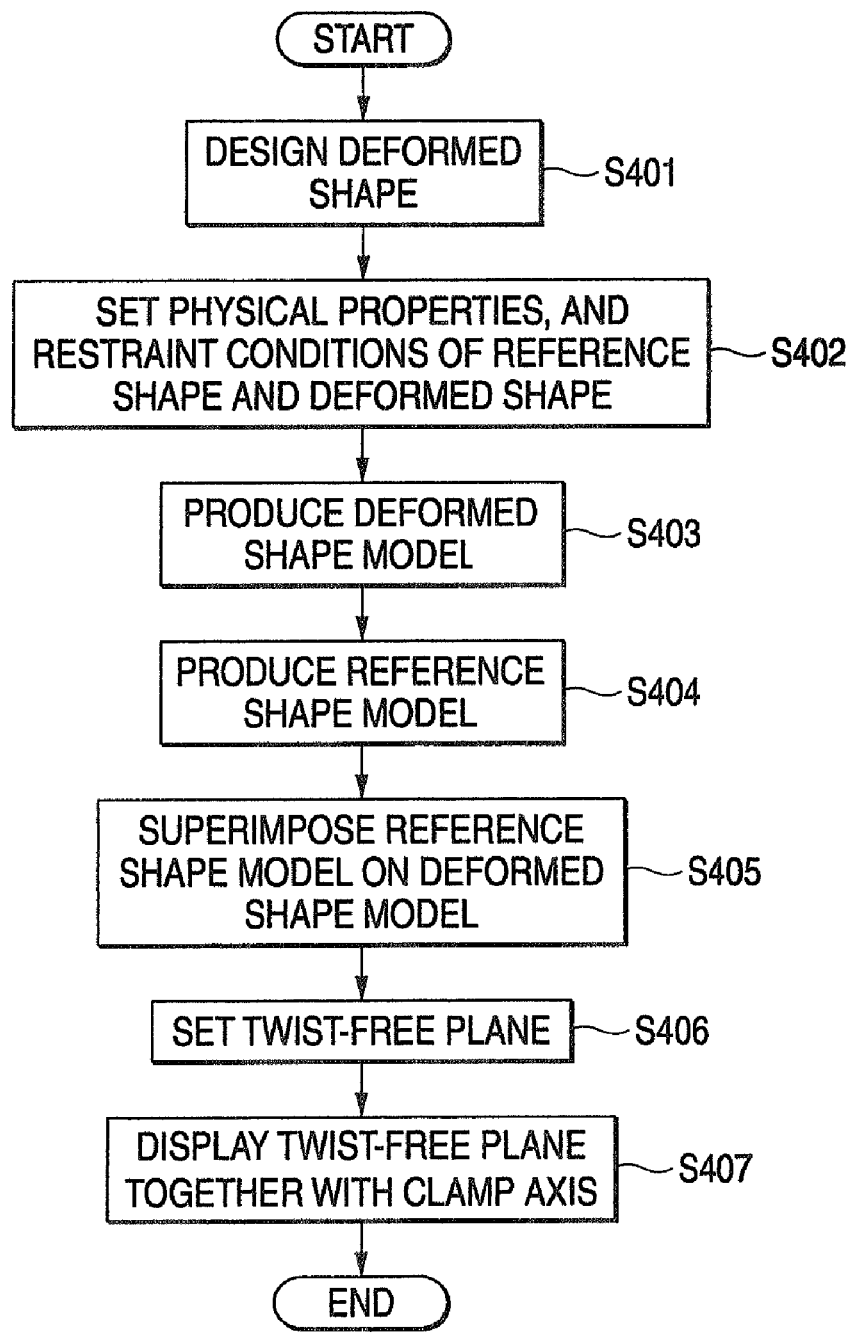
FIG. 20 is a flowchart showing a process procedure in a fourth embodiment of the invention.
Figure 21:
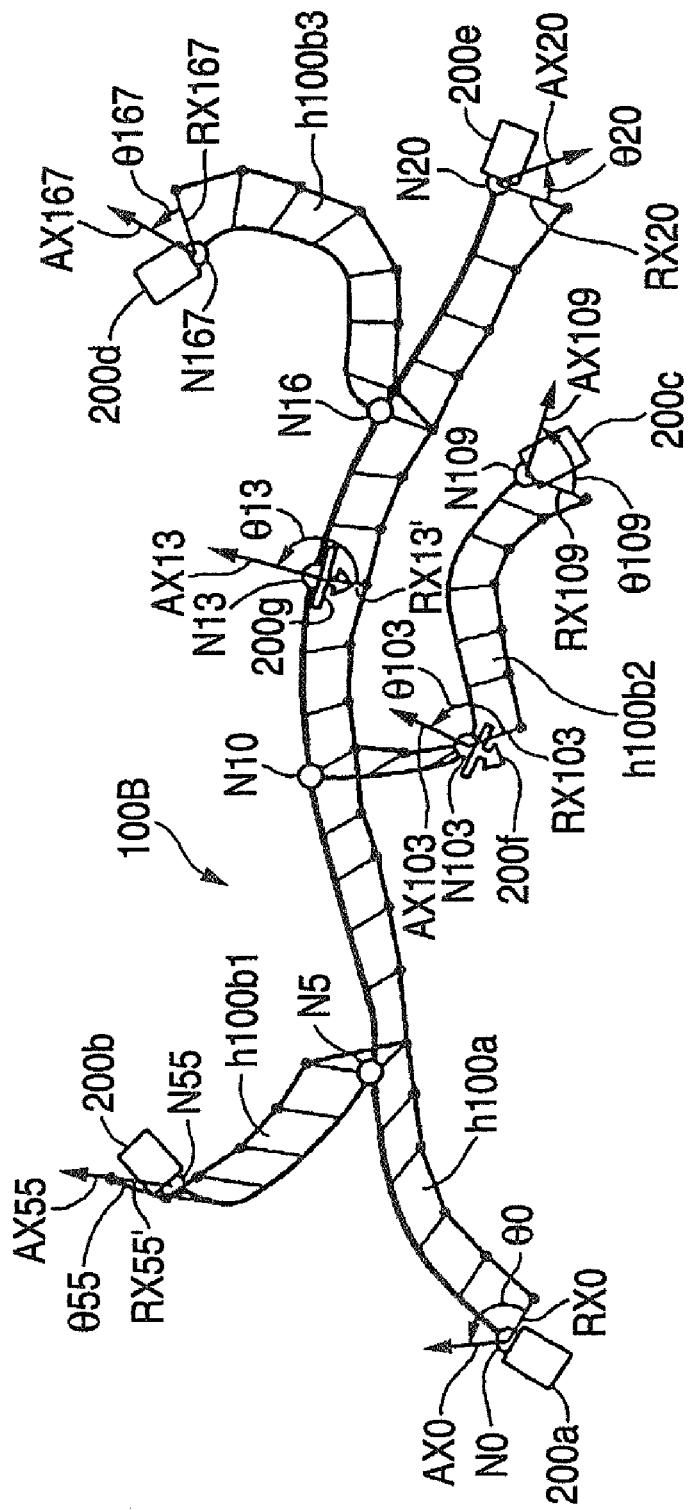
FIG. 21 is a view exemplarily showing a result of the process of FIG. 20.

FIG. 20 is a flowchart showing a process procedure in a fourth embodiment of the invention, FIG. 21 is a view exemplarily showing a result of the process of FIG. 20, and FIGS. 22(A) to 22(C) are views illustrating a propagation process in twist-free planes. The fourth embodiment is configured by expanding the concept of the first embodiment so as to display twist-free planes, thereby enabling twist angles of clamp axes to be easily grasped.

In the process procedure of the embodiment shown in FIG. 20, steps S401 to S405 are identical with steps S301 to S305 shown in FIG. 16, and hence duplicated description is omitted.

When the process proceeds to step S406 after passing through steps S401 to S405, twist-free planes h100$a$, h100$b$1, h100$b$2, and h100$b$3 such as shown in FIG. 21 are set in step S406. The twist-free planes h100$a$, h100$b$1, h100$b$2, and h100$b$3 correspond to the trunk wire 100$a$, and the branch wires 100$b$1, 100$b$2, 100$b$3, respectively. The twist-free planes h100$a$, h100$b$1, h100$b$2, and h100$b$3 can be set by, with respect to all the reference axes which are already calculated in step S405, for example, sequentially connecting ends of adjacent reference axes. In order to grasp the twist state, preferably, the reference axes have the same length. In place of the above-described configuration where the twist-free planes are expressed as a fin-like shape by connecting ends of reference axes as described above, a plurality of reference axes may be continuously displayed. In this configuration also, it is possible to roughly grasp the twist state. Step S406 corresponds to the twist-free plane setting step in the claims.

Such twist-free planes can be set also in a wire harness which has no branch wire as illustrated in the first embodiment, and also in a wire harness which has branch wires as illustrated in the present embodiment. In the case of a wire harness having branch wires which branch off from a trunk wire, however, it is necessary to conduct the following propagation process in twist-free planes.

Figure 22:
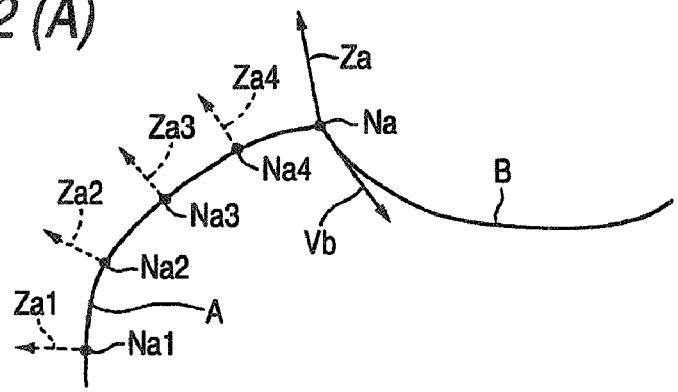
FIGS. 22(A) to 22(C) are views illustrating a propagation process in twist-free planes.
Figure 22:
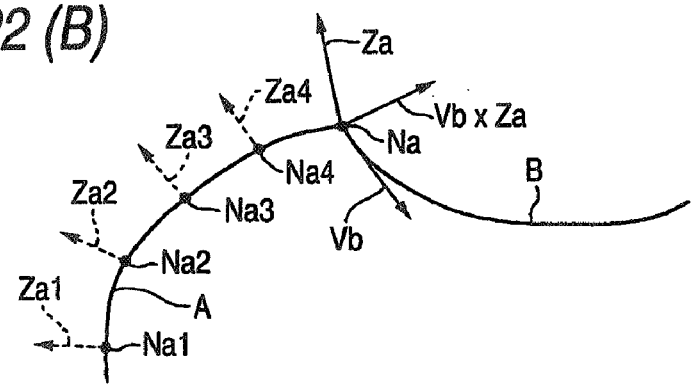
Figure 22:
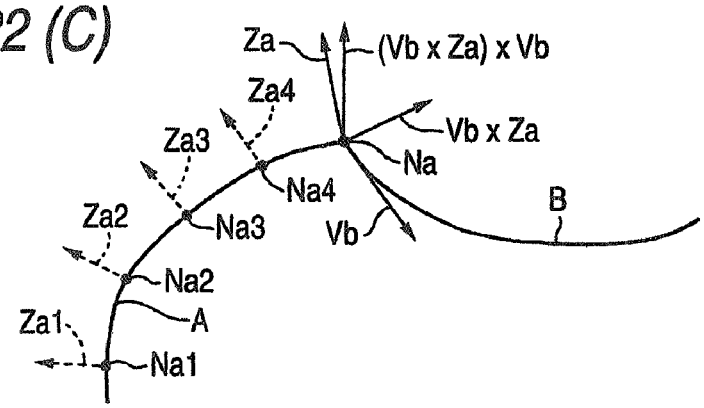

Referring to FIGS. 22(A) to 22(C), the wire A corresponds to the trunk wire 100$a$, and the wire B corresponds to the branch wire 100$b$1 or the like which branches off from the trunk wire 100$a$, and to which twist-free planes of the trunk wire 100$a$ are propagated. As shown in FIG. 22(A), first, twist-free vectors Za1, Za2, Za3, Za4, Za are set respectively to nodes Na1, Na2, Na3, Na4, Na which are allocated to the wire A, and propagation of the twist-free planes of segments of the wire A to segments of the discontinuous wire B is then considered. In the figure, Vb designates a tangent vector of the wire B.

As shown in FIG. 22(B), the twist-free planes propagated to the segments of the discontinuous wire B exist in a plane formed by a vector Za (the last twist-free vector of the wire A) and a vector Vb. Therefore, the normal vector Vb×Za of the plane is produced. The normal vector Vb×Za is the outer vector of the vector Vb and the vector Za.

As shown in FIG. 22(C), the outer product (Vb×Za)×vector Vb of the normal vector Vb×Za and the vector Vb is the desired twist-free vector of the segment of the wire B. In this way, twist-free vectors are propagated, thereby enabling also the twist-free planes to be propagated.

In step S407, as shown in FIG. 21, the deformed shape 100B to which the twist-free planes h100$a$, h100$b$1, h100$b$2, and h100$b$3 are added is displayed on the display device 43 together with the clamp axes AX0, AX13, AX20, AX55, AX103, AX109, and AX167. Clamp axes to be displayed are set to, for example, nodes to which the clamps are attached. Alternatively, other clamp axes may be displayed, or no clamp axis may be displayed. The twist angles θ0, θ13, and the like may be simultaneously displayed. In addition to the display on the display device 43, printing may be conducted on a paper sheet by the print device 44. Step S407 corresponds to the twist displaying step in the claims.

As described above, according to the fourth embodiment of the invention, the superimposing process is conducted with using a finite element method, and the twist-free planes of a fin-like shape are additionally displayed, thereby enabling twist angles of clamps attached to a trunk wire and/or branch wires with respect to the twist-free planes, to be easily grasped. Consequently, the embodiment is effective in adequate design of a jig plate, efficient production of a wire harness, and the like.

Although the invention has been described in detail with reference to particular embodiments, it will be obvious to those skilled in the art that various changes and modifications can be made without departing the spirit and scope of the invention.

The application is based on Japanese Patent Application (Application No. 2003-137294) filed on May 15, 2003 and Japanese Patent Application (Application No. 2004-011570) filed on Jan. 20, 2004, and their contents are incorporated herein by reference.

INDUSTRIAL APPLICABILITY

The invention is not restricted to a wire-like structure which is to be laid in a vehicle, such as a wire harness, and may be similarly applicable also to a wire-like structure which is to be laid indoors.

We claim:

1. A method of calculating a twist angle in a wire-like structure in which a twist angle of a sub wire bundle and/or a clamp is calculated with using a computer, the twist angle being produced when the wire-like structure is deformed from a predetermined reference shape to a deformed shape that is different from the reference shape, the wire-like structure including a main wire bundle, the sub wire bundle that branches off from the main wire bundle, and/or the clamp that is attached to the main wire bundle, the method comprising:

a deformed shape model producing step of producing a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle;

a reference shape model producing step of producing a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle;

a superimposition calculating step of, with using a finite element method, calculating a shape obtained by deforming the reference shape model and superimposing the deformed reference shape model on the deformed shape model, while referring shape and material properties of the wire-like structure; a twist angle calculating step of, after the superimposition calculating step, calculating an angle formed by the reference axis, and the clamp axis and/or the virtual clamp axis, as the twist angle; and a twist angle outputting step of outputting the twist angle for use in making wire harnesses.

2. The method of calculating a twist angle in a wire-like structure according to claim 1, wherein the reference shape corresponds to a shape obtained when the wire-like structure is developed on a jig plate; and the deformed shape corresponds to a shape obtained when the wire-like structure is attached to a predetermined portion.

3. The method of calculating a twist angle in a wire-like structure according to claim 1, in order to calculate the virtual clamp axis, further comprising:

a tangent plane producing step of producing a tangent plane which contains both a tangent vector with respect to the sub wire bundle, and a tangent vector with respect to the main wire bundle, the tangent vectors starting at the sub wire bundle branch node; and a virtual clamp axis calculating step of calculating a vector as the virtual clamp axis, the vector starting in the tangent plane at the sub wire bundle branch node and being perpendicular to the tangent vector with respect to the main wire bundle.

4. The method of calculating a twist angle in a wire-like structure according to claim 3, further comprising:

a displaying step of displaying the clamp axis and/or the virtual clamp axis together with the reference shape model, while returning by a degree corresponding to the twist angle.

5. A method of calculating a twist angle in a wire-like structure in which twist angles of sub wire bundles are calculated with using a computer, the twist angles being produced when a wire-like structure is deformed to a predetermined shape, the wire-like structure being designed so as to be laid in a predetermined portion, and including a main wire bundle and the sub wire bundles that branch off from the main wire bundle, the method comprising:

a finite element model producing step of producing a finite element model of the wire-like structure while assuming that the wire-like structure is an elastic body in which a plurality of beam elements are coupled together;

a deforming step of deforming the wire-like structure to a reference shape in which the main wire bundle exists in a predetermined plane, by applying shape and material properties and restraint conditions of the wire-like structure to the finite element model;

a twist angle calculating step of calculating angles which are formed by the sub wire bundles with respect to the plane, as the twist angles; and a twist angle outputting step of outputting the twist angles for use in making wire harnesses.

6. The method of calculating a twist angle in a wire-like structure according to claim 5, wherein the restraint conditions corresponding to the reference shape are set so that the main wire bundle is linearly stretched without being twisted.

7. The method of calculating a twist angle in a wire-like structure according to claim 5, wherein the wire-like structure includes a clamp which is attached to the main wire bundle, and which can produce a twist; and an angle which is formed by a rotation axis of the clamp with respect to the plane is calculated as the twist angle.

8. The method of calculating a twist angle in a wire-like structure according to claim 5, wherein the wire-like structure includes, in place of the sub wire bundles, a clamp which is attached to the main wire bundle, and which can produce a twist; and an angle which is formed by a rotation axis of the clamp, in place of the sub wire bundles, with respect to the plane is calculated as the twist angle.

9. The method of calculating a twist angle in a wire-like structure according to claim 5, wherein the plane is a reference plane in which a jig plate that is to be used in production of the wire-like structure is supposed.

10. The method of calculating a twist angle in a wire-like structure according to claim 9, wherein the main wire bundle has a largest diameter among all wire bundles constituting the wire-like structure.

11. The method of calculating a twist angle in a wire-like structure according to claim 10, wherein the restraint conditions are set so that a wire bundle which, among the sub wire bundles, is next in thickness to the main wire bundle exists in the reference plane.

12. A computer readable storage medium storing a computer executable program that, when executed by a computer, calculates a twist angle in a wire-like structure wherein, in order to calculate a twist state of a sub wire bundle and/or a clamp, the twist angle being produced when the wire-like structure is deformed from a predetermined reference shape to a deformed shape that is different from the reference shape, the wire-like structure including: a main wire bundle; the sub wire bundle that branches off from the main wire bundle; and/or the clamp that is attached to the main wire bundle, the program causes a computer to function as:

a deformed shape model producing unit that produces a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle;

a reference shape model producing unit that produces a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle;

a superimposition calculating unit that calculates a shape obtained by deforming the reference shape model and superimposing the deformed reference shape model on the deformed shape model, with using a finite element method, while referring shape and material properties of the wire-like structure;

a twist angle calculating unit that calculates an angle formed by the reference axis, and the clamp axis and/or the virtual clamp axis, as the twist angle, after calculation by the superimposition calculating unit; and a twist angle outputting unit that outputs the twist angle for use in making wire harnesses.

13. A method of calculating a twist angle in a wire-like structure in which a twist angle of a clamp attached to a sub wire member that branches off from a main wire member, as viewed from a side of the main wire member is calculated with using a computer, the method comprising:

a main wire member deformed shape model producing step of producing a main wire member deformed shape model in which a deformed shape of the main wire member is expressed as a coupled member of a plurality of beam elements, and a branch axis for obtaining a twist angle of the sub wire member is added to a wire member branch node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node;

a main wire member angle calculating step of, with using a finite element method, calculating a first twist angle while referring physical properties of the wire-like structure, the first twist angle being an angle which is formed by the first reference axis and the branch axis when the main wire member reference shape model is deformed and then superimposed on the main wire member deformed shape model;

a sub wire member deformed shape model producing step of producing a sub wire member deformed shape model in which a deformed shape of the sub wire member is expressed as a coupled member of a plurality of beam elements, and a clamp axis for obtaining a twist angle of the clamp is added to a clamp attachment node on the sub wire member;

a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis;

a sub wire member angle calculating step of, with using a finite element method, calculating a second twist angle while referring physical properties of the wire-like structure, the second twist angle being an angle which is formed by the second reference axis and the clamp axis when the sub wire member reference shape model is deformed and then superimposed on the sub wire member deformed shape model; a twist angle calculating step of correcting the second twist angle on the basis of the first twist angle to obtain an angle formed by the first reference axis and the clamp axis; and a twist angle outputting step of outputting the angle formed by the first reference axis and the clamp axis for use in making wire harnesses.

14. A method of calculating a twist angle in a wire-like structure in which a twist angle of a second sub wire member branching off from a sub wire member that branches off from a main wire member, as viewed from a side of the main wire member is calculated with using a computer, the method comprising:

a main wire member deformed shape model producing step of producing a main wire member deformed shape model in which a deformed shape of the main wire member is expressed as a coupled member of a plurality of beam elements, and a first branch axis for obtaining a twist angle of the sub wire member is added to a wire member branch node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the first branch axis is added to a position corresponding to the wire member branch node;

a main wire member angle calculating step of, with using a finite element method, calculating a first twist angle while referring physical properties of the wire-like structure, the first twist angle being an angle which is formed by the first reference axis and the first branch axis when the main wire member reference shape model is deformed and then superimposed on the main wire member deformed shape model;

a sub wire member deformed shape model producing step of producing a sub wire member deformed shape model in which a deformed shape of the sub wire member is expressed as a coupled member of a plurality of beam elements, and a second branch axis for obtaining a twist angle of the second sub wire member is added to a second wire member branch node on the sub wire member;

a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the second branch axis is added to a position corresponding to the second wire member branch node;

a sub wire member angle calculating step of, with using a finite element method, calculating a second twist angle while referring physical properties of the wire-like structure, the second twist angle being an angle which is formed by the second reference axis and the second branch axis when the sub wire member reference shape model is deformed and then superimposed on the sub wire member deformed shape model; a twist angle calculating step of correcting the second twist angle on the basis of the first twist angle to obtain an angle formed by the first reference axis and the second branch axis; and a twist angle outputting step of outputting the angle formed by the first reference axis and the second branch axis for use in making wire harnesses.

15. A computer readable storage medium storing a computer executable program that, when executed by a computer, calculates a twist angle in a wire-like structure wherein, in order to calculate a twist angle of a clamp attached to a sub wire member that branches off from a main wire member, as viewed from a side of the main wire member, the program causes a computer to function as:

a main wire member deformed shape model producing unit that produces a main wire member deformed shape model in which a deformed shape of the main wire member is expressed as a coupled member of a plurality of beam elements, and a branch axis for obtaining a twist angle of the sub wire member is added to a wire member branch node on the main wire member;

a main wire member reference shape model producing unit that produces a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node;

a main wire member angle calculating unit that calculates a first twist angle while referring physical properties of the wire-like structure, with using a finite element method, the first twist angle being an angle which is formed by the first reference axis and the branch axis when the main wire member reference shape model is deformed and then superimposed on the main wire member deformed shape model;

a sub wire member deformed shape model producing unit that produces a sub wire member deformed shape model in which a deformed shape of the sub wire member is expressed as a coupled member of a plurality of beam elements, and a clamp axis for obtaining a twist angle of the clamp is added to a clamp attachment node on the sub wire member;

a sub wire member reference shape model producing unit that produces a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis;

a sub wire member angle calculating unit that calculates a second twist angle while referring physical properties of the wire-like structure, with using a finite element method, the second twist angle being an angle which is formed by the second reference axis and the clamp axis when the sub wire member reference shape model is deformed and then superimposed on the sub wire member deformed shape model; a twist angle calculating unit that corrects the second twist angle on the basis of the first twist angle to obtain an angle formed by the first reference axis and the clamp axis; and a twist angle outputting unit that outputs the angle formed by the first reference axis and the clamp axis for use in making wire harnesses.

16. A method of calculating a twist angle in a wire-like structure in which a twist angle of a clamp attached to a main wire member, with respect to a twist-free plane is calculated with using a computer, and then displayed, the method comprising:

a main wire member deformed shape model producing step of producing a main wire member deformed shape model in which a deformed shape of the main wire member is expressed as a coupled member of a plurality of beam elements, and a clamp axis for expressing a twist angle of the clamp is added to a clamp attachment node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively;

a twist-free plane setting step of setting the twist-free plane by connecting together the reference axes when the main wire member reference shape model is deformed and then superimposed on the main wire member deformed shape model; and a displaying step of displaying the twist-free plane together with the deformed shape and the clamp axis for use in making wire harnesses.

17. The method of calculating a twist angle in a wire-like structure according to claim 16, wherein the method includes a second displaying step of displaying the twist-free plane together with the deformed shape, in place of the displaying step for use in making wire harnesses.

18. A method of calculating a twist angle in a wire-like structure in which twist angles of clamps attached to a main wire member and a sub wire member that branches off from the main wire member, with respect to a twist-free plane are calculated with using a computer, and then displayed, the method comprising:

a main wire member deformed shape model producing step of producing a main wire member deformed shape model in which a deformed shape of the main wire member is expressed as a coupled member of a plurality of beam elements, and a first clamp axis for expressing a twist angle of a clamp on the main wire member is added to a clamp attachment node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and first reference axes for obtaining a first twist-free plane are added to nodes including a position corresponding to the clamp attachment node, respectively;

a first twist-free plane setting step of setting the first twist-free plane by connecting together the first reference axes when the main wire member reference shape model is deformed and then superimposed on the main wire member deformed shape model;

a sub wire member deformed shape model producing step of producing a sub wire member deformed shape model in which a deformed shape of the sub wire member is expressed as a coupled member of a plurality of beam elements, and a second clamp axis for expressing a twist angle of a clamp on the sub wire member is added to a clamp attachment node on the sub wire member;

a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and second reference axes for obtaining a second twist-free plane are added to nodes including a position corresponding to the clamp attachment node, respectively;

a second twist-free plane setting step of setting the second twist-free plane by connecting together the second reference axes when twists of the first reference axes constituting the first twist-free plane are propagated to the second reference axes, and the sub wire member reference shape model is deformed and then superimposed on the sub wire member deformed shape model; and a displaying step of displaying the first twist-free plane and the second twist-free plane together with the deformed shape, the first clamp axis, and the second clamp axis for use in making wire harnesses.

19. An apparatus for calculating a twist angle in a wire-like structure in which a twist angle of a clamp attached to a main wire member, with respect to a twist-free plane is calculated with using a computer, and then displayed, wherein the apparatus comprising:

a main wire member deformed shape model producing unit that produces a main wire member deformed shape model in which a deformed shape of the main wire member is expressed as a coupled member of a plurality of beam elements, and a clamp axis for expressing a twist angle of the clamp is added to a clamp attachment node on the main wire member;

a main wire member reference shape model producing unit that produces a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively;

a twist-free plane setting unit that sets the twist-free plane by connecting together the reference axes when the main wire member reference shape model is deformed and then superimposed on the main wire member deformed shape model; and a displaying unit that displays the twist-free plane together with the deformed shape and the clamp axis for use in making wire harnesses.

20. A computer readable storage medium storing a computer executable program that, when executed by a computer calculates a twist angle in a wire-like structure wherein, in order to calculate and display a twist angle of a clamp attached to a main wire member, the program causes a computer to function as:

a main wire member deformed shape model producing unit that produces a main wire member deformed shape model in which a deformed shape of the main wire member is expressed as a coupled member of a plurality of beam elements, and a clamp axis for expressing a twist angle of the clamp is added to a clamp attachment node on the main wire member;

a main wire member reference shape model producing unit that produces a main wire member reference shape model in which the main wire member is expressed as a coupled member of a plurality of beam elements so as to correspond to a main wire member reference shape that is a shape obtained by straightly stretching the main wire member without being twisted, and reference axes for obtaining the twist-free plane are added to nodes including a position corresponding to the clamp attachment node, respectively;

a twist-free plane setting unit that sets the twist-free plane by connecting together the reference axes when the main wire member reference shape model is deformed and then superimposed on the main wire member deformed shape model; and a displaying unit that displays the twist-free plane together with the deformed shape and the clamp axis for use in making wire harnesses.

21. A method of calculating a twist angle in a wire-like structure in which a twist angle of a sub wire bundle and/or a clamp is calculated with using a computer, the twist angle being produced when the wire-like structure is deformed from a predetermined reference shape to a deformed shape that is different from the reference shape, the wire-like structure including a main wire bundle, the sub wire bundle that branches off from the main wire bundle, and/or the clamp that is attached to the main wire bundle, the method comprising:

a deformed shape model producing step of producing a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle;

a reference shape model producing step of producing a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle;

a superimposition calculating step of, with using a finite element method, calculating a shape obtained by deforming the reference shape model and superimposing the deformed reference shape model on the deformed shape model, while referring shape and material properties of the wire-like structure; a twist angle calculating step of, after the superimposition calculating step, calculating an angle formed by the reference axis, and the clamp axis and/or the virtual clamp axis, as the twist angle; and a twist angle outputting step of outputting the twist angle for use in making wire harnesses;

wherein a wire harness making apparatus uses said twist angle to make a wire harness.

22. A method of calculating a twist angle in a wire-like structure in which twist angles of sub wire bundles are calculated with using a computer, the twist angles being produced when a wire-like structure is deformed to a predetermined shape, the wire-like structure being designed so as to be laid in a predetermined portion, and including a main wire bundle and the sub wire bundles that branch off from the main wire bundle, the method comprising:

a finite element model producing step of producing a finite element model of the wire-like structure while assuming that the wire-like structure is an elastic body in which a plurality of beam elements are coupled together;

a deforming step of deforming the wire-like structure to a reference shape in which the main wire bundle exists in a predetermined plane, by applying shape and material properties and restraint conditions of the wire-like structure to the finite element model;

a twist angle calculating step of calculating angles which are formed by the sub wire bundles with respect to the plane, as the twist angles; and a twist angle outputting step of outputting the twist angles for use in making wire harnesses;

wherein a wire harness making apparatus uses said twist angle to make a wire harness.

23. A computer readable storage medium storing a computer executable program that, when executed by a computer, calculates a twist angle in a wire-like structure wherein, in order to calculate a twist state of a sub wire bundle and/or a clamp, the twist angle being produced when the wire-like structure is deformed from a predetermined reference shape to a deformed shape that is different from the reference shape, the wire-like structure including: a main wire bundle; the sub wire bundle that branches off from the main wire bundle; and/or the clamp that is attached to the main wire bundle, the program causes a computer to function as:

a deformed shape model producing unit that produces a deformed shape model in which the main wire bundle of the wire-like structure is expressed as a coupled member of a plurality of beam elements so as to correspond to the deformed shape, and a clamp axis corresponding to a rotation axis of the clamp and/or a virtual clamp axis corresponding to a branching direction of the sub wire bundle is added to each of a clamp attachment node and/or sub wire bundle branch node of the main wire bundle;

a reference shape model producing unit that produces a reference shape model in which the main wire bundle of the wire-like structure is expressed as a coupled member of a plurality of beam elements so as to correspond to the reference shape, and a predetermined reference axis is added to a clamp attachment node and/or sub wire bundle branch node of the main wire bundle;

a superimposition calculating unit that calculates a shape obtained by deforming the reference shape model and superimposing the deformed reference shape model on the deformed shape model, with using a finite element method, while referring shape and material properties of the wire-like structure;

a twist angle calculating unit that calculates an angle formed by the reference axis, and the clamp axis and/or the virtual clamp axis, as the twist angle, after calculation by the superimposition calculating unit; and a twist angle outputting unit that outputs the twist angle for use in making wire harnesses;

wherein a wire harness making apparatus uses said twist angle to make a wire harness.

24. A method of calculating a twist angle in a wire-like structure in which a twist angle of a clamp attached to a sub wire member that branches off from a main wire member, as viewed from a side of the main wire member is calculated with using a computer, the method comprising:

a main wire member deformed shape model producing step of producing a main wire member deformed shape model in which a deformed shape of the main wire member is expressed as a coupled member of a plurality of beam elements, and a branch axis for obtaining a twist angle of the sub wire member is added to a wire member branch node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node;

a main wire member angle calculating step of, with using a finite element method, calculating a first twist angle while referring physical properties of the wire-like structure, the first twist angle being an angle which is formed by the first reference axis and the branch axis when the main wire member reference shape model is deformed and then superimposed on the main wire member deformed shape model;

a sub wire member deformed shape model producing step of producing a sub wire member deformed shape model in which a deformed shape of the sub wire member is expressed as a coupled member of a plurality of beam elements, and a clamp axis for obtaining a twist angle of the clamp is added to a clamp attachment node on the sub wire member;

a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis;

a sub wire member angle calculating step of, with using a finite element method, calculating a second twist angle while referring physical properties of the wire-like structure, the second twist angle being an angle which is formed by the second reference axis and the clamp axis when the sub wire member reference shape model is deformed and then superimposed on the sub wire member deformed shape model; a twist angle calculating step of correcting the second twist angle on the basis of the first twist angle to obtain an angle formed by the first reference axis and the clamp axis; and a twist angle outputting step of outputting the angle formed by the first reference axis and the clamp axis for use in making wire harnesses;

wherein a wire harness making apparatus uses said twist angle to make a wire harness.

25. A method of calculating a twist angle in a wire-like structure in which a twist angle of a second sub wire member branching off from a sub wire member that branches off from a main wire member, as viewed from a side of the main wire member is calculated with using a computer, the method comprising:

a main wire member deformed shape model producing step of producing a main wire member deformed shape model in which a deformed shape of the main wire member is expressed as a coupled member of a plurality of beam elements, and a first branch axis for obtaining a twist angle of the sub wire member is added to a wire member branch node on the main wire member;

a main wire member reference shape model producing step of producing a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the first branch axis is added to a position corresponding to the wire member branch node;

a main wire member angle calculating step of, with using a finite element method, calculating a first twist angle while referring physical properties of the wire-like structure, the first twist angle being an angle which is formed by the first reference axis and the first branch axis when the main wire member reference shape model is deformed and then superimposed on the main wire member deformed shape model;

a sub wire member deformed shape model producing step of producing a sub wire member deformed shape model in which a deformed shape of the sub wire member is expressed as a coupled member of a plurality of beam elements, and a second branch axis for obtaining a twist angle of the second sub wire member is added to a second wire member branch node on the sub wire member;

a sub wire member reference shape model producing step of producing a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the second branch axis is added to a position corresponding to the second wire member branch node;

a sub wire member angle calculating step of, with using a finite element method, calculating a second twist angle while referring physical properties of the wire-like structure, the second twist angle being an angle which is formed by the second reference axis and the second branch axis when the sub wire member reference shape model is deformed and then superimposed on the sub wire member deformed shape model; a twist angle calculating step of correcting the second twist angle on the basis of the first twist angle to obtain an angle formed by the first reference axis and the second branch axis; and a twist angle outputting step of outputting the angle formed by the first reference axis and the second branch axis for use in making wire harnesses;

wherein a wire harness making apparatus uses said twist angle to make a wire harness.

26. A computer readable storage medium storing a computer executable program that, when executed by a computer, calculates a twist angle in a wire-like structure wherein, in order to calculate a twist angle of a clamp attached to a sub wire member that branches off from a main wire member, as viewed from a side of the main wire member, the program causes a computer to function as:

a main wire member deformed shape model producing unit that produces a main wire member deformed shape model in which a deformed shape of the main wire member is expressed as a coupled member of a plurality of beam elements, and a branch axis for obtaining a twist angle of the sub wire member is added to a wire member branch node on the main wire member;

a main wire member reference shape model producing unit that produces a main wire member reference shape model in which the main wire member is expressed as a coupled member of a plurality of beam elements so as to correspond to a main wire member reference shape that is a shape obtained by straightly stretching the main wire member without being twisted, and a first reference axis which functions as a reference for obtaining a twist angle of the branch axis is added to a position corresponding to the wire member branch node;

a main wire member angle calculating unit that calculates a first twist angle while referring physical properties of the wire-like structure, with using a finite element method, the first twist angle being an angle which is formed by the first reference axis and the branch axis when the main wire member reference shape model is deformed and then superimposed on the main wire member deformed shape model;

a sub wire member deformed shape model producing unit that produces a sub wire member deformed shape model in which a deformed shape of the sub wire member is expressed as a coupled member of a plurality of beam elements, and a clamp axis for obtaining a twist angle of the clamp is added to a clamp attachment node on the sub wire member;

a sub wire member reference shape model producing unit that produces a sub wire member reference shape model in which the sub wire member is expressed as a coupled member of a plurality of beam elements so as to correspond to a sub wire member reference shape that is a shape obtained by straightly stretching the sub wire member without being twisted, and a second reference axis which functions as a reference for obtaining a twist angle of the clamp axis is added to a position corresponding to the clamp axis;

a sub wire member angle calculating unit that calculates a second twist angle while referring physical properties of the wire-like structure, with using a finite element method, the second twist angle being an angle which is formed by the second reference axis and the clamp axis when the sub wire member reference shape model is deformed and then superimposed on the sub wire member deformed shape model; a twist angle calculating unit that corrects the second twist angle on the basis of the first twist angle to obtain an angle formed by the first reference axis and the clamp axis; and a twist angle outputting unit that outputs the angle formed by the first reference axis and the clamp axis for use in making wire harnesses;

wherein a wire harness making apparatus uses said twist angle to make a wire harness.

\* \* \* \* \*